United States Patent
Hu et al.

(10) Patent No.: US 9,681,417 B2
(45) Date of Patent: Jun. 13, 2017

(54) PAGING METHOD, APPARATUS, AND SYSTEM

(71) Applicant: Huawei Technologies Co., Ltd., Shenzhen, Guangdong (CN)

(72) Inventors: Zhenxing Hu, Shenzhen (CN); Yongqiang Gao, Beijing (CN); Wei Quan, Beijing (CN); Bingzhao Li, Beijing (CN); Jian Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/281,987

(22) Filed: Sep. 30, 2016

(65) Prior Publication Data

US 2017/0019878 A1 Jan. 19, 2017

Related U.S. Application Data

(63) Continuation of application No. PCT/CN2014/074513, filed on Apr. 1, 2014.

(51) Int. Cl.
*H04W 72/00* (2009.01)
*H04W 68/02* (2009.01)
(Continued)

(52) U.S. Cl.
CPC ......... *H04W 68/02* (2013.01); *H04W 72/005* (2013.01); *H04W 72/0446* (2013.01); *H04W 76/048* (2013.01)

(58) Field of Classification Search
CPC . H04W 76/048; H04W 68/02; H04W 72/005; H04W 72/0446
See application file for complete search history.

(56) References Cited

U.S. PATENT DOCUMENTS

2014/0071957 A1* 3/2014 Xu .................... H04W 52/0219
370/336
2014/0098761 A1* 4/2014 Lee .................... H04W 74/006
370/329

FOREIGN PATENT DOCUMENTS

CN 101350936 A 1/2009
CN 102948233 A 2/2013
(Continued)

OTHER PUBLICATIONS

"Coverage enhancement for physical channels and signals for low-cost MTC", Huawei, HiSilicon, 3GPP TSG RAN WG1 Meeting #72, Jan. 28-Feb. 1, 2013, 9 pages.
(Continued)

*Primary Examiner* — Asghar Bilgrami

(57) ABSTRACT

Embodiments of the present invention provide a paging method, apparatus, and system, so as to implement paging of UE in an area with relatively poor signal coverage. UE includes: a receiving unit, configured to receive a broadcast message sent by a base station; and a determining unit, configured to determine whether the UE is first UE where the determining unit is further configured to: in a case in which it is determined that the UE is the first UE, determine a start PF and a start PO according to the first radio frame parameter; the determining unit is further configured to determine a first subframe set according to the start PF and the start PO; and the receiving unit is further configured to receive, according to the start PF, the start PO, and the first subframe set, a paging message sent by the base station.

15 Claims, 8 Drawing Sheets

(51) Int. Cl.
*H04W 72/04* (2009.01)
*H04W 76/04* (2009.01)

(56) References Cited

FOREIGN PATENT DOCUMENTS

| | | |
|---|---|---|
| CN | 103209395 A | 7/2013 |
| EP | 3032897 A1 | 6/2016 |
| WO | 2011/099753 A2 | 8/2011 |

OTHER PUBLICATIONS

"Paging in Enhanced Coverage Mode", Huawei, HiSilicon, 3GPP TSG-RAN WG2 #85, Feb. 10-14, 2014, 3 pages.

\* cited by examiner

| Ns | i_s=0 | i_s=1 | i_s=2 | i_s=3 |
|---|---|---|---|---|
| 1 | PO=9 | Unavailable | Unavailable | Unavailable |
| 2 | PO=4 | PO=9 | Unavailable | Unavailable |
| 4 | PO=0 | PO=4 | PO=5 | PO=9 |

| Ns | i_s=0 | i_s=1 | i_s=2 | i_s=3 |
|---|---|---|---|---|
| 1 | PO=0 | Unavailable | Unavailable | Unavailable |
| 2 | PO=0 | PO=5 | Unavailable | Unavailable |
| 4 | PO=0 | PO=1 | PO=5 | PO=6 |

PAGING METHOD, APPARATUS, AND SYSTEM

CROSS-REFERENCE TO RELATED APPLICATIONS

This application is a continuation of International Application No. PCT/CN2014/074513, filed on Apr. 1, 2014, the disclosure of which is hereby incorporated by reference in its entirety.

TECHNICAL FIELD

The present invention relates to the field of mobile communications, and in particular, to a paging method, apparatus, and system.

BACKGROUND

In mobile communication, before communication is established between a base station and UE (user equipment), the base station needs to send a paging message to a called UE, and the called UE needs to receive the paging message in a PO (Paging Occasion) of a PF (Paging Frame, paging frame) that is obtained by means of calculation within one DRX (Discontinuous Reception, discontinuous reception) period.

In an actual scenario, some UEs may be within an area with relatively poor signal coverage, to ensure that UE within an area with relatively poor signal coverage can normally receive a paging message, a base station needs to repeatedly send the paging message to the UE in an area with relatively poor signal coverage, so as to ensure successful paging of the UE in an area with relatively poor signal coverage.

When multiple UEs exist in a same area with relatively poor signal coverage, when a paging message is repeatedly sent to any one UE of the multiple UEs, sending time of paging messages for other UEs is not considered. If sending time of paging messages of at least two UEs has different start time, the paging messages of the at least two UEs may be repeatedly sent in a same subframe. In this case, UE receives at least two paging messages in a PO of a PF obtained by means of calculation, and as a result, the UE cannot successfully parse out a paging message of the UE, which further affects paging of UE in an area with relatively poor signal coverage.

SUMMARY

Embodiments of the present invention provides a paging method, apparatus, and system, so as to implement paging of UE in an area with relatively poor signal coverage.

To achieve the foregoing objective, the following technical solutions are used in the embodiments of the present invention:

According to first aspect, an embodiment of the present invention provides user equipment UE, including: a receiving unit, configured to receive, by the user equipment UE, a broadcast message sent by a base station, where the broadcast message includes: a first radio frame parameter; and a determining unit, configured to determine whether the UE is first UE, where the first UE is UE in a coverage enhancement mode, and the coverage enhancement mode is a mode in which a paging message sent by the base station needs to be repeatedly received, where the determining unit is further configured to: in a case in which it is determined that the UE is the first UE, determine a start PF and a start PO according to the first radio frame parameter; the determining unit is further configured to determine a first subframe set according to the start PF and the start PO, where the first subframe set is M first subframes in which the paging message can be received and that follow the start PO of the start PF, and M is a quantity of times that the UE needs to repeatedly receive the paging message; and the receiving unit is further configured to receive, according to the start PF, the start PO, and the first subframe set, the paging message sent by the base station.

In a first possible implementation manner of the first aspect, the broadcast message further includes: a second radio frame parameter, and a value of the second radio frame parameter is different from a value of the first radio frame parameter; the determining unit is further configured to: in a case in which it is determined that the UE is not the first UE, determine a second subframe according to the second radio frame parameter; and the receiving unit is further configured to receive, in the second subframe, a second paging message sent by the base station.

With respect to the first aspect or the first possible implementation manner of the first aspect, in a second possible implementation manner of the first aspect, the first subframe is a subframe, other than a multicast broadcast single frequency network MBSFN subframe, in each frame; or the first subframe is a subframe whose sequence number is 0 or 4 or 5 or 9 in each frame; or the first subframe is a subframe whose sequence number is 0 or 1 or 5 or 6 in each frame.

With respect to the first aspect or the first or second possible implementation manner of the first aspect, in third possible implementation manner of the first aspect, the first radio frame parameter is nB, where nB is used to determine a quantity of paging occasions in each paging frame, a value of nB is less than a value of a first discontinuous reception period, and the first discontinuous reception period is a period in which the UE in the coverage enhancement mode receives a paging message.

With respect to the first aspect or the first or second possible implementation manner of the first aspect, in a fourth possible implementation manner of the first aspect, the first radio frame parameter is nB and a first discontinuous reception period, where a value of nB is less than a value of the first discontinuous reception period, and the first discontinuous reception period is a period in which the UE in the coverage enhancement mode receives a paging message.

With respect to the first aspect or the first or second possible implementation manner of the first aspect, in a fifth possible implementation manner of the first aspect, the first radio frame parameter is a first discontinuous reception period, where the first discontinuous reception period is a period in which the UE in the coverage enhancement mode receives a paging message; and the determining unit is specifically configured to determine a PF, which meets a formula SFNmodT=0, in a system frame number SFN as the start PF, and determine a preset PO as the start PO, where T denotes the first discontinuous reception period.

With respect to the first aspect or the first or second possible implementation manner of the first aspect, in a sixth possible implementation manner of the first aspect, the first radio frame parameter is a first discontinuous reception period and a PF offset; and the determining unit is specifically configured to determine a PF, which meets a formula SFNmodT=W, in an SFN as the start PF, and determine a preset PO as the start PO, where W denotes the PF offset, and T denotes the first discontinuous reception period.

With respect to the first aspect or the first or second possible implementation manner of the first aspect, in a seventh possible implementation manner of the first aspect, the first radio frame parameter is a first discontinuous reception period, a PF offset, and a first PO; and the determining unit is specifically configured to determine a PF, which meets a formula SFNmodT=W, in an SFN as the start PF, and determine the first PO as the start PO, where T denotes the first discontinuous reception period, and W denotes the PF offset.

With respect to the first aspect or any one of the first to seventh possible implementation manners of the first aspect, in an eighth possible implementation manner of the first aspect, the UE further includes: an obtaining unit and a sending unit, where the obtaining unit is configured to obtain adjustment information, where the adjustment information is used to record a correspondence between a coverage enhancement level and a grading parameter, the grading parameter is used to differentiate UEs having different coverage enhancement levels, and a coverage enhancement level of the UE corresponds to a quantity of times that the UE receives a paging message; the obtaining unit is further configured to obtain the coverage enhancement level of the UE; the sending unit is configured to send the coverage enhancement level to the base station; the determining unit is further configured to determine a grading parameter of the UE according to the adjustment information and the coverage enhancement level of the UE; and the receiving unit is specifically configured to receive, according to the start PF, the start PO, the first subframe set, and the grading parameter of the UE, the paging message sent by the base station; or the determining unit is specifically configured to determine the start PF and the start PO according to the first radio frame parameter and the grading parameter of the UE.

With respect to the eighth possible implementation manner of the first aspect, in a ninth possible implementation manner of the first aspect, the obtaining unit is specifically configured to receive the adjustment information sent by the base station; or the obtaining unit is specifically configured to obtain the prestored adjustment information locally.

With respect to the eighth or ninth possible implementation manner of the first aspect, in a tenth possible implementation manner of the first aspect, the grading parameter includes: a radio network temporary identity RNTI, or a PO offset, or a PF group, or a PO group, where the PF group is used to record a PF corresponding to one coverage enhancement level, and the PO group is used to record one PO corresponding to the coverage enhancement level.

With respect to the tenth possible implementation manner of the first aspect, in an eleventh possible implementation manner of the first aspect, the grading parameter includes: the RNTI, where the receiving unit is specifically configured to receive, in the start PO of the start PF and in a subframe in the first subframe set according to the RNTI of the UE, the paging message sent by the base station.

With respect to the tenth possible implementation manner of the first aspect, in a twelfth possible implementation manner of the first aspect, the grading parameter includes: the PO offset, the determining unit is specifically configured to determine a first PF and the first PO according to the first radio frame parameter; and the determining unit is specifically configured to: determine, as the start PF and the start PO, a corresponding PF and PO that are obtained after an offset of subframes whose quantity equals the PO offset of the UE and in which the paging message can be received is performed starting with the first PO of the first PF.

With respect to the tenth possible implementation manner of the first aspect, in a thirteenth possible implementation manner of the first aspect, the grading parameter includes: the PF group, where the determining unit is specifically configured to determine a first PF and the first PO according to the first radio frame parameter; and the determining unit is specifically configured to determine the first PF and the first PO of a PF corresponding to the PF group of the UE as the start PF and the start PO.

With respect to the tenth possible implementation manner of the first aspect, in a fourteenth possible implementation manner of the first aspect, the grading parameter includes: the PO group, where the determining unit is specifically configured to determine a first PF according to the first radio frame parameter; and the determining unit is specifically configured to determine the first PF and a PO corresponding to the PO group of the UE as the start PF and the start PO.

With respect to the first aspect or any one of the first to fourteenth possible implementation manners of the first aspect, in a fifteenth possible implementation manner of the first aspect, the UE further includes: an update unit, where the update unit is configured to update information about a camp-on cell and/or paging enhancement information, where the camp-on cell is a cell to which the UE is currently connected, and the paging enhancement information is used to indicate the coverage enhancement level of the UE; and the sending unit is configured to send the updated information about the camp-on cell and/or the updated paging enhancement information to the base station.

According to a second aspect, an embodiment of the present invention provides a base station, including: a sending unit, configured to send a broadcast message to user equipment UE, where the broadcast message includes: a first radio frame parameter; and a determining unit, configured to determine whether the UE is first UE, where the first UE is UE in a coverage enhancement mode, and the coverage enhancement mode is a mode in which the base station needs to repeatedly send a paging message, where the determining unit is further configured to: in a case in which it is determined that the UE is the first UE, determine a start PF and a start PO according to the first radio frame parameter; the determining unit is further configured to determine a first subframe set according to the start PF and the start PO, where the first subframe set includes M first subframes in which the paging message can be sent and that follow the start PO of the start PF, and M is a quantity of times that the base station needs to repeatedly send the paging message; and the sending unit is configured to send the paging message to the UE according to the start PF, the start PO, and the first subframe set.

In a first possible implementation manner of the second aspect, the broadcast message further includes: a second radio frame parameter, and a value of the second radio frame parameter is different from a value of the first radio frame parameter; the determining unit is further configured to: in a case in which it is determined that the UE is not the first UE, determine a second subframe according to the second radio frame parameter; and the sending unit is further configured to send a second paging message to the UE in the second subframe.

With respect to the second aspect or the first possible implementation manner of the second aspect, in a second possible implementation manner of the second aspect, the first subframe is a subframe, other than a multicast broadcast single frequency network MBSFN subframe, in each frame; or the first subframe is a subframe whose sequence number is 0 or 4 or 5 or 9 in each frame; or the first subframe is a subframe whose sequence number is 0 or 1 or 5 or 6 in each frame.

With respect to the second aspect or the first or second possible implementation manner of the second aspect, in a third possible implementation manner of the second aspect, the first radio frame parameter is nB, where nB is used to determine a quantity of paging occasions in each paging frame, a value of nB is less than a value of a first discontinuous reception period, and the first discontinuous reception period is a period in which the UE in the coverage enhancement mode receives a paging message.

With respect to the second aspect or the first or second possible implementation manner of the second aspect, in a fourth possible implementation manner of the second aspect, the first radio frame parameter is nB and a first discontinuous reception period, where a value of nB is less than a value of the first discontinuous reception period, and the first discontinuous reception period is a period in which the UE in the coverage enhancement mode receives a paging message.

With respect to the second aspect or the first or second possible implementation manner of the second aspect, in a fifth possible implementation manner of the second aspect, the first radio frame parameter is a first discontinuous reception period, where the first discontinuous reception period is a period in which the UE in the coverage enhancement mode receives a paging message; and the determining unit is specifically configured to determine a PF, which meets a formula SFNmodT=0, in a system frame number SFN as the start PF, and determine a preset PO as the start PO, where T denotes the first discontinuous reception period.

With respect to the second aspect or the first or second possible implementation manner of the second aspect, in a sixth possible implementation manner of the second aspect, the first radio frame parameter is a first discontinuous reception period and a PF offset; and the determining unit is specifically configured to determine a PF, which meets a formula SFNmodT=W, in an SFN as the start PF, and determine a preset PO as the start PO; W denotes the PF offset, where T denotes the first discontinuous reception period.

With respect to the second aspect or the first or second possible implementation manner of the second aspect, in a seventh possible implementation manner of the second aspect, the first radio frame parameter is a first discontinuous reception period, and a PF offset, and a first PO; and the determining unit is specifically configured to determine a PF, which meets a formula SFNmodT=W, in an SFN as the start PF, and determine the first PO as the start PO, where T denotes the first discontinuous reception period, and W denotes the PF offset.

With respect to the second aspect or any one of the first to seventh possible implementation manners of the second aspect, in an eighth possible implementation manner of the second aspect, the base station further includes: a receiving unit, where the sending unit is further configured to send adjustment information to the UE, where the adjustment information is used to record a correspondence between a coverage enhancement level and a grading parameter, the grading parameter is used to differentiate UEs having different coverage enhancement levels, and a coverage enhancement level of the UE corresponds to a quantity of times that the UE needs to repeatedly receive a paging message; the receiving unit is configured to receive the coverage enhancement level, sent by the UE, of the UE; the determining unit is further configured to determine a grading parameter of the UE according to the adjustment information and the coverage enhancement level of the UE; and the determining unit is specifically configured to determine the start PF and the start PO according to the first radio frame parameter and the grading parameter of the UE; or the sending unit is specifically configured to send the paging message to the UE according to the start PF, the start PO, the first subframe set, and the grading parameter of the UE.

With respect to the eighth possible implementation manner of the second aspect, in a ninth possible implementation manner of the second aspect, the grading parameter includes: a radio network temporary identity RNTI, or a PO offset, or a paging frame PF group, or a PO group, where the PF group is used to record a PF corresponding to one coverage enhancement level, and the PO group is used to record one PO corresponding to the coverage enhancement level.

With respect to the ninth possible implementation manner of the second aspect, in a tenth possible implementation manner of the second aspect, the grading parameter includes: the RNTI, where the sending unit is specifically configured to send the paging message in the start PO of the start PF and in a subframe in the first subframe set according to the RNTI of the UE.

With respect to the ninth possible implementation manner of the second aspect, in an eleventh possible implementation manner of the second aspect, the grading parameter includes: the PO offset, where the determining unit is specifically configured to determine a first PF and the first PO according to the first radio frame parameter; and the determining unit is specifically configured to: determine, as the start PF and the start PO, a corresponding PF and PO that are obtained after an offset of subframes whose quantity equals the PO offset of the UE and in which the paging message can be received is performed starting with the first PO of the first PF.

With respect to the ninth possible implementation manner of the second aspect, in a twelfth possible implementation manner of the second aspect, the grading parameter includes: the PF group, where the determining unit is specifically configured to determine a first PF and the first PO according to the first radio frame parameter; and the determining unit is specifically configured to determine the first PF and the first PO of a PF corresponding to the PF group of the UE as the start PF and the start PO.

With respect to the ninth possible implementation manner of the second aspect, in a thirteenth possible implementation manner of the second aspect, the grading parameter includes: the PO group, where the determining unit is specifically configured to determine a first PF according to the first radio frame parameter; and the determining unit is specifically configured to determine the first PF and a PO corresponding to the PO group of the UE as the start PF and the start PO.

With respect to the second aspect or any one of the first to thirteenth possible implementation manners of the second aspect, in a fourteenth possible implementation manner of the second aspect, the receiving unit is further configured to receive information, about a camp-on cell, sent by the UE and/or paging enhancement information, where the camp-on cell is a cell to which the UE is currently connected, and the paging enhancement information is used to indicate the coverage enhancement level of the UE.

According to a third aspect, an embodiment of the present invention provides a paging method, including: receiving, by user equipment UE, a broadcast message sent by a base station, where the broadcast message includes: a first radio frame parameter; determining, by the UE, whether the UE is first UE, where the first UE is UE in a coverage enhancement mode, and the coverage enhancement mode is a mode in which a paging message sent by the base station needs to be repeatedly received; when the UE determines that the UE is the first UE, determining, by the UE, a start PF and a start PO according to the first radio frame parameter; determining, by the UE, a first subframe set according to the start PF and the start PO, where the first subframe set includes M first subframes in which the paging message can be received and that follow the start PO of the start PF, and M is a quantity of times that the UE needs to repeatedly receive the paging message; and receiving, by the UE according to the start PF, the start PO, and the first subframe set, the paging message sent by the base station.

In a first possible implementation manner of the third aspect, the broadcast message further includes: a second radio frame parameter, and a value of the second radio frame parameter is different from a value of the first radio frame parameter; when the UE determines that the UE is not the first UE, the UE determines a second subframe according to the second radio frame parameter; and the UE receives, in the second subframe, a second paging message sent by the base station.

With respect to the third aspect or the first possible implementation manner of the third aspect, in a second possible implementation manner of the third aspect, the first subframe is a subframe, other than a multicast broadcast single frequency network MBSFN subframe, in each frame; or the first subframe is a subframe whose sequence number is 0 or 4 or 5 or 9 in each frame; or the first subframe is a subframe whose sequence number is 0 or 1 or 5 or 6 in each frame.

With respect to the third aspect or the first or second possible implementation manner of the third aspect, in a third possible implementation manner of the third aspect, the first radio frame parameter is nB, where nB is used to determine a quantity of paging occasions in each paging frame, a value of nB is less than a value of a first discontinuous reception period, and the first discontinuous reception period is a period in which the UE in the coverage enhancement mode receives a paging message.

With respect to the third aspect or the first or second possible implementation manner of the third aspect, in a fourth possible implementation manner of the third aspect, the first radio frame parameter is nB and a first discontinuous reception period, where a value of nB is less than a value of the first discontinuous reception period, and the first discontinuous reception period is a period in which the UE in the coverage enhancement mode receives a paging message.

With respect to the third aspect or the first or second possible implementation manner of the third aspect, in a fifth possible implementation manner of the third aspect, the first radio frame parameter is a first discontinuous reception period, where the first discontinuous reception period is a period in which the UE in the coverage enhancement mode receives a paging message; and the determining, by the UE, a start PF and a start PO according to the first radio frame parameter includes: determining, by the UE, a PF, which meets a formula $SFN \bmod T = 0$, in a system frame number SFN as the start PF, and determining a preset PO as the start PO, where T denotes the first discontinuous reception period.

With respect to the third aspect or the first or second possible implementation manner of the third aspect, in a sixth possible implementation manner of the third aspect, the first radio frame parameter is a first discontinuous reception period and a PF offset; and the determining, by the UE, a start PF and a start PO according to the first radio frame parameter includes: determining, by the UE, a PF, which meets a formula $SFN \bmod T = W$, in an SFN as the start PF, and determining a preset PO as the start PO, where W denotes the PF offset, and T denotes the first discontinuous reception period.

With respect to the third aspect or the first or second possible implementation manner of the third aspect, in a seventh possible implementation manner of the third aspect, the first radio frame parameter is a first discontinuous reception period, and a PF offset, and a first PO; the determining, by the UE, a start PF and a start PO according to the first radio frame parameter includes: determining, by the UE, a PF, which meets a formula $SFN \bmod T = W$, in an SFN as the start PF, and determining the first PO as the start PO, where T denotes the first discontinuous reception period, and W denotes the PF offset.

With respect to the third aspect or any one of the first to seventh possible implementation manners of the third aspect, in an eighth possible implementation manner of the third aspect, before the determining, by the UE, a start PF and a start PO according to the first radio frame parameter, the paging method further includes: obtaining, by the UE, adjustment information, where the adjustment information is used to record a correspondence between a coverage enhancement level and a grading parameter, the grading parameter is used to differentiate UEs having different coverage enhancement levels, and a coverage enhancement level of the UE corresponds to a quantity of times that the UE receives a paging message; obtaining, by the UE, the coverage enhancement level of the UE, and sending the coverage enhancement level to the base station; and determining, by the UE, a grading parameter of the UE according to the adjustment information and the coverage enhancement level of the UE; where the receiving, by the UE according to the start PF, the start PO, and the first subframe set, the paging message sent by the base station includes: receiving, by the UE according to the start PF, the start PO, the first subframe set, and the grading parameter of the UE, the paging message sent by the base station; or the determining, by the UE, a start PF and a start PO according to the first radio frame parameter includes: determining, by the UE, the start PF and the start PO according to the first radio frame parameter and the grading parameter of the UE.

With respect to the eighth possible implementation manner of the third aspect, in a ninth possible implementation manner of the third aspect, the obtaining, by the UE, adjustment information includes: receiving, by the UE, the adjustment information sent by the base station; or obtaining, by the UE, the prestored adjustment information locally.

With respect to the eighth or ninth possible implementation manner of the third aspect, in a tenth possible implementation manner of the third aspect, the grading parameter includes: a radio network temporary identity RNTI, or a PO offset, or a PF group, or a PO group, where the PF group is used to record a PF corresponding to one coverage enhancement level, and the PO group is used to record one PO corresponding to the coverage enhancement level.

With respect to the tenth possible implementation manner of the third aspect, in an eleventh possible implementation manner of the third aspect, the grading parameter includes: the RNTI, where the receiving, by the UE according to the start PF, the start PO, the first subframe set, and the grading parameter of the UE, the paging message sent by the base station includes: receiving, by the UE in the start PO of the start PF and in a subframe in the first subframe set according to the RNTI of the UE, the paging message sent by the base station.

With respect to the tenth possible implementation manner of the third aspect, in a twelfth possible implementation manner of the third aspect, the grading parameter includes: the PO offset, and the determining, by the UE, the start PF and the start PO according to the first radio frame parameter and the grading parameter of the UE includes: determining, by the UE, a first PF and the first PO according to the first radio frame parameter, and determining, by the UE as the start PF and the start PO, a corresponding PF and PO that are obtained after an offset of subframes whose quantity equals the PO offset of the UE and in which the paging message can be received is performed starting with the first PO of the first PF.

With respect to the tenth possible implementation manner of the third aspect, in a thirteenth possible implementation manner of the third aspect, the grading parameter includes: the PF group, where the determining, by the UE, the start PF and the start PO according to the first radio frame parameter and the grading parameter of the UE includes: determining, by the UE, a first PF and the first PO according to the first radio frame parameter; and determining, by the UE, the first PF and the first PO of a PF corresponding to the PF group of the UE as the start PF and the start PO.

With respect to the tenth possible implementation manner of the third aspect, in a fourteenth possible implementation manner of the third aspect, the grading parameter includes: the PO group, where the determining, by the UE, the start PF and the start PO according to the first radio frame parameter and the grading parameter of the UE includes: determining, by the UE, a first PF according to the first radio frame parameter; and determining, by the UE, the first PF and a PO corresponding to the PO group of the UE as the start PF and the start PO.

With respect to the third aspect or any one of the first to fourteenth possible implementation manners of the third aspect, in a fifteenth possible implementation manner of the third aspect, the paging method further includes: updating, by the UE, information about a camp-on cell and/or paging enhancement information, where the camp-on cell is a cell to which the UE is currently connected, and the paging enhancement information is used to indicate the coverage enhancement level of the UE; and sending, by the UE, the updated information about the camp-on cell and/or the updated paging enhancement information to the base station.

According to a fourth aspect, an embodiment of the present invention provides a paging method, including: sending, by a base station, a broadcast message to user equipment UE, where the broadcast message includes: a first radio frame parameter; determining, by the base station, whether the UE is first UE, where the first UE is UE in a coverage enhancement mode, and the coverage enhancement mode is a mode in which the base station needs to repeatedly send a paging message; when the base station determines that the UE is the first UE, determining, by the base station, a start PF and a start PO according to the first radio frame parameter; determining, by the base station, a first subframe set according to the start PF and the start PO, where the first subframe set includes M first subframes in which the paging message can be sent and that follow the start PO of the start PF, and M is a quantity of times that the base station needs to repeatedly send the paging message; and sending, by the base station, the paging message to the UE according to the start PF, the start PO, and the first subframe set.

In a first possible implementation manner of the fourth aspect, the broadcast message further includes: a second radio frame parameter, and a value of the second radio frame parameter is different from a value of the first radio frame parameter; when the base station determines that the UE is not the first UE, the base station determines a second subframe according to the second radio frame parameter; and the base station sends a second paging message to the UE in the second subframe.

With respect to the fourth aspect or the first possible implementation manner of the fourth aspect, in a second possible implementation manner of the fourth aspect, the first subframe is a subframe, other than a multicast broadcast single frequency network MBSFN subframe, in each frame; or the first subframe is a subframe whose sequence number is 0 or 4 or 5 or 9 in each frame; or the first subframe is a subframe whose sequence number is 0 or 1 or 5 or 6 in each frame.

With respect to the fourth aspect or the first or second possible implementation manner of the fourth aspect, in a third possible implementation manner of the fourth aspect, the first radio frame parameter is nB, where nB is used to determine a quantity of paging occasions in each paging frame, a value of nB is less than a value of a first discontinuous reception period, and the first discontinuous reception period is a period in which the UE in the coverage enhancement mode receives a paging message.

With respect to the fourth aspect or the first or second possible implementation manner of the fourth aspect, in a fourth possible implementation manner of the fourth aspect, the first radio frame parameter is nB and a first discontinuous reception period, where a value of nB is less than a value of the first discontinuous reception period, and the first discontinuous reception period is a period in which the UE in the coverage enhancement mode receives a paging message.

With respect to the fourth aspect or the first or second possible implementation manner of the fourth aspect, in a fifth possible implementation manner of the fourth aspect, the first radio frame parameter is a first discontinuous reception period, where the first discontinuous reception period is a period in which the UE in the coverage enhancement mode receives a paging message; and the determining, by the base station, a start PF and a start PO according to the first radio frame parameter includes: determining, by the base station, a PF, which meets a formula SFNmodT=0, in a system frame number SFN as the start PF, and determining a preset PO as the start PO, where T denotes the first discontinuous reception period.

With respect to the fourth aspect or the first or second possible implementation manner of the fourth aspect, in a sixth possible implementation manner of the fourth aspect, the first radio frame parameter is a first discontinuous reception period and a PF offset; and the determining, by the base station, a start PF and a start PO according to the first radio frame parameter includes: determining, by the base station, a PF, which meets a formula SFNmodT=W, in an SFN as the start PF, and determining a preset PO as the start PO, where W denotes the PF offset, and T denotes the first discontinuous reception period.

With respect to the fourth aspect or the first or second possible implementation manner of the fourth aspect, in a seventh possible implementation manner of the fourth aspect, the first radio frame parameter is a first discontinuous reception period, and a PF offset, and a first PO; and the determining, by the base station, a start PF and a start PO according to the first radio frame parameter includes: determining, by the base station, a PF, which meets a formula SFNmodT=W, in an SFN as the start PF, and determining the first PO as the start PO, where T denotes the first discontinuous reception period, and W denotes the PF offset.

With respect to the fourth aspect or any one of the first to seventh possible implementation manners of the fourth aspect, in an eighth possible implementation manner of the fourth aspect, the paging method further includes: sending, by the base station, adjustment information to the UE, where the adjustment information is used to record a correspondence between a coverage enhancement level and a grading parameter, the grading parameter is used to differentiate UEs having different coverage enhancement levels, and a coverage enhancement level of the UE corresponds to a quantity of times that the UE needs to repeatedly receive a paging message; receiving, by the base station, the coverage enhancement level, sent by the UE, of the UE; and determining, by the base station, a grading parameter of the UE according to the adjustment information and the coverage enhancement level of the UE; and the determining, by the base station, a start PF and a start PO according to the first radio frame parameter includes: determining, by the base station, the start PF and the start PO according to the first radio frame parameter and the grading parameter of the UE; or the sending, by the base station, the paging message to the UE according to the start PF, the start PO, and the first subframe set includes: sending, by the base station, the paging message to the UE according to the start PF, the start PO, the first subframe set, and the grading parameter of the UE.

With respect to the eighth possible implementation manner of the fourth aspect, in a ninth possible implementation manner of the fourth aspect, the grading parameter includes: a radio network temporary identity RNTI, or a PO offset, or a PF group, or a PO group, where the PF group is used to record a PF corresponding to one coverage enhancement level, and the PO group is used to record one PO corresponding to the coverage enhancement level.

With respect to the ninth possible implementation manner of the fourth aspect, in a tenth possible implementation manner of the fourth aspect, the grading parameter includes: the RNTI, where the sending, by the base station, the paging message to the UE according to the start PF, the start PO, the first subframe set, and the grading parameter of the UE includes: sending, by the base station, the paging message according to the RNTI of the UE in the start PO of the start PF and a subframe in the first subframe set.

With respect to the ninth possible implementation manner of the fourth aspect, in an eleventh possible implementation manner of the fourth aspect, the grading parameter includes: the PO offset, where the determining, by the base station, the start PF and the start PO according to the first radio frame parameter and the grading parameter of the UE includes: determining, by the base station, a first PF and the first PO according to the first radio frame parameter; and determining, by the base station as the start PF and the start PO, a corresponding PF and PO that are obtained after an offset of subframes whose quantity equals the PO offset of the UE and in which the paging message can be received is performed starting with the first PO of the first PF.

With respect to the ninth possible implementation manner of the fourth aspect, in a twelfth possible implementation manner of the fourth aspect, the grading parameter includes: the PF group, where the determining, by the base station, the start PF and the start PO according to the first radio frame parameter and the grading parameter of the UE includes: determining, by the base station, a first PF and the first PO according to the first radio frame parameter; and determining, by the base station, the first PF and the first PO of a PF corresponding to the PF group of the UE as the start PF and the start PO.

With respect to the ninth possible implementation manner of the fourth aspect, in a thirteenth possible implementation manner of the fourth aspect, the grading parameter includes: the PO group, where the determining, by the base station, the start PF and the start PO according to the first radio frame parameter and the grading parameter of the UE includes: determining, by the base station, a first PF according to the first radio frame parameter; and determining, by the base station, the first PF and a PO corresponding to the PO group of the UE as the start PF and the start PO.

With respect to the fourth aspect or any one of the first to thirteenth possible implementation manners of the fourth aspect, in a fourteenth possible implementation manner of the fourth aspect, the paging method further includes: receiving, by the base station, information, about a camp-on cell, sent by the UE and/or paging enhancement information, where the camp-on cell is a cell to which the UE is currently connected; and the paging enhancement information is used to indicate the coverage enhancement level of the UE.

According to a fifth aspect, an embodiment of the present invention provides user equipment UE, including: a receiver, configured to receive a broadcast message sent by a base station, where the broadcast message includes: a first radio frame parameter; and a processor, configured to determine whether the UE is first UE, where the first UE is UE in a coverage enhancement mode, and the coverage enhancement mode is a mode in which a paging message sent by the base station needs to be repeatedly received, where the processor is further configured to: in a case in which it is determined that the UE is the first UE, determine a start PF and a start PO according to the first radio frame parameter; the processor is further configured to determine a first subframe set according to the start PF and the start PO, where the first subframe set includes M first subframes in which the paging message can be received and that follow the start PO of the start PF, and M is a quantity of times that the UE needs to repeatedly receive the paging message; and the receiver is further configured to receive, according to the start PF, the start PO, and the first subframe set, the paging message sent by the base station.

In a first possible implementation manner of the fifth aspect, the broadcast message further includes: a second radio frame parameter, and a value of the second radio frame parameter is different from a value of the first radio frame parameter; the processor is further configured to: in a case in which it is determined that the UE is not the first UE, determine a second subframe according to the second radio frame parameter; and the receiver is further configured to receive, in the second subframe, a second paging message sent by the base station.

With respect to the fifth aspect or the first possible implementation manner of the fifth aspect, in a second possible implementation manner of the fifth aspect, the first subframe is a subframe, other than a multicast broadcast single frequency network MBSFN subframe, in each frame; or the first subframe is a subframe whose sequence number is 0 or 4 or 5 or 9 in each frame; or the first subframe is a subframe whose sequence number is 0 or 1 or 5 or 6 in each frame.

With respect to the fifth aspect or the first or second possible implementation manner of the fifth aspect, in a third possible implementation manner of the fifth aspect, the first radio frame parameter is nB, where nB is used to determine a quantity of paging occasions in each paging frame, a value of nB is less than a value of a first discontinuous reception period, and the first discontinuous reception period is a period in which the UE in the coverage enhancement mode receives a paging message.

With respect to the fifth aspect or the first or second possible implementation manner of the fifth aspect, in a fourth possible implementation manner of the fifth aspect, the first radio frame parameter is nB and a first discontinuous reception period, where a value of nB is less than a value of the first discontinuous reception period, and the first discontinuous reception period is a period in which the UE in the coverage enhancement mode receives a paging message.

With respect to the fifth aspect or the first or second possible implementation manner of the fifth aspect, in a fifth possible implementation manner of the fifth aspect, the first radio frame parameter is a first discontinuous reception period, where the first discontinuous reception period is a period in which the UE in the coverage enhancement mode receives a paging message; and the processor is specifically configured to determine a PF, which meets a formula SFNmodT=0, in a system frame number SFN as the start PF, and determine a preset PO as the start PO, where T denotes the first discontinuous reception period.

With respect to the fifth aspect or the first or second possible implementation manner of the fifth aspect, in a sixth possible implementation manner of the fifth aspect, the first radio frame parameter is a first discontinuous reception period and a PF offset; and the processor is specifically configured to determine a PF, which meets a formula SFNmodT=W, in an SFN as the start PF, and determine a preset PO as the start PO, where W denotes the PF offset, and T denotes the first discontinuous reception period.

With respect to the fifth aspect or the first or second possible implementation manner of the fifth aspect, in a seventh possible implementation manner of the fifth aspect, the first radio frame parameter is a first discontinuous reception period, and a PF offset, and a first PO; and the processor is specifically configured to determine a PF, which meets a formula SFNmodT=W in an SFN as the start PF, and determine the first PO as the start PO, where T denotes the first discontinuous reception period, and W denotes the PF offset.

With respect to the fifth aspect or any one of the first to seventh possible implementation manners of the fifth aspect, in an eighth possible implementation manner of the fifth aspect, the UE further includes: a transmitter, where the processor is further configured to obtain adjustment information, where the adjustment information is used to record a correspondence between a coverage enhancement level and a grading parameter, the grading parameter is used to differentiate UEs having different coverage enhancement levels, and a coverage enhancement level of the UE corresponds to a quantity of times that the UE receives a paging message; the processor is further configured to obtain the coverage enhancement level of the UE; the transmitter is configured to send the coverage enhancement level to the base station; the processor is further configured to determine a grading parameter of the UE according to the adjustment information and the coverage enhancement level of the UE; and the receiver is specifically configured to receive, according to the start PF, the start PO, the first subframe set, and the grading parameter of the UE, the paging message sent by the base station; or the processor is specifically configured to determine the start PF and the start PO according to the first radio frame parameter and the grading parameter of the UE.

With respect to the eighth possible implementation manner of the fifth aspect, in a ninth possible implementation manner of the fifth aspect, the processor is specifically configured to receive the adjustment information sent by the base station; or the processor is specifically configured to obtain the prestored adjustment information locally.

With respect to the eighth or ninth possible implementation manner of the fifth aspect, in a tenth possible implementation manner of the fifth aspect, the grading parameter includes: a radio network temporary identity RNTI, or a PO offset, or a PF group, or a PO group, where the PF group is used to record a PF corresponding to one coverage enhancement level, and the PO group is used to record one PO corresponding to the coverage enhancement level.

With respect to the tenth possible implementation manner of the fifth aspect, in an eleventh possible implementation manner of the fifth aspect, the grading parameter includes: the RNTI, where the receiver is specifically configured to receive, in the start PO of the start PF and in a subframe in the first subframe set according to the RNTI of the UE, the paging message sent by the base station.

With respect to the tenth possible implementation manner of the fifth aspect, in a twelfth possible implementation manner of the fifth aspect, the grading parameter includes: the PO offset, where the processor is specifically configured to determine a first PF and the first PO according to the first radio frame parameter; and the processor is specifically configured to: determine, as the start PF and the start PO, a corresponding PF and PO that are obtained after an offset of subframes whose quantity equals the PO offset of the UE and in which the paging message can be received is performed starting with the first PO of the first PF.

With respect to the tenth possible implementation manner of the fifth aspect, in a thirteenth possible implementation manner of the fifth aspect, the grading parameter includes: the PF group, where the processor is specifically configured to determine a first PF and the first PO according to the first radio frame parameter; and the processor is specifically configured to determine the first PF and the first PO of a PF corresponding to the PF group of the UE as the start PF and the start PO.

With respect to the tenth possible implementation manner of the fifth aspect, in a fourteenth possible implementation manner of the fifth aspect, the grading parameter includes: the PO group, where the processor is specifically configured to determine a first PF according to the first radio frame parameter; and the processor is specifically configured to determine the first PF and a PO corresponding to the PO group of the UE as the start PF and the start PO.

With respect to the fifth aspect or any one of the first to fourteenth possible implementation manners of the fifth aspect, in a fifteenth possible implementation manner of the fifth aspect, the processor is further configured to update information about a camp-on cell and/or paging enhancement information, where the camp-on cell is a cell to which the UE is currently connected, and the paging enhancement information is used to indicate the coverage enhancement level of the UE; and the transmitter is further configured to send the updated information about the camp-on cell and/or the updated paging enhancement information to the base station.

According to a sixth aspect, an embodiment of the present invention provides a base station, including: a transmitter, configured to send a broadcast message to user equipment UE, where the broadcast message includes: a first radio frame parameter; and a processor, configured to determine whether the UE is first UE, where the first UE is UE in a coverage enhancement mode, and the coverage enhancement mode is a mode in which the base station needs to repeatedly send a paging message, where the processor is further configured to: in a case in which it is determined that the UE is the first UE, determine a start PF and a start PO according to the first radio frame parameter; the processor is further configured to determine a first subframe set according to the start PF and the start PO, where the first subframe set includes M first subframes in which the paging message can be sent and that follow the start PO of the start PF, and M is a quantity of times that the base station needs to repeatedly send the paging message; and the transmitter is configured to send the paging message to the UE according to the start PF, the start PO, and the first subframe set.

In a first possible implementation manner of the sixth aspect, the broadcast message further includes: a second radio frame parameter, and a value of the second radio frame parameter is different from a value of the first radio frame parameter; the processor is further configured to: in a case in which it is determined that the UE is not the first UE, determine a second subframe according to the second radio frame parameter; and the transmitter is further configured to send a second paging message to the UE in the second subframe.

With respect to the sixth aspect or the first possible implementation manner of the sixth aspect, in a second possible implementation manner of the sixth aspect, the first subframe is a subframe, other than a multicast broadcast single frequency network MBSFN subframe, in each frame; or the first subframe is a subframe whose sequence number is 0 or 4 or 5 or 9 in each frame; or the first subframe is a subframe whose sequence number is 0 or 1 or 5 or 6 in each frame.

With respect to the sixth aspect or the first or second possible implementation manner of the sixth aspect, in a third possible implementation manner of the sixth aspect, the first radio frame parameter is nB, where nB is used to determine a quantity of paging occasions in each paging frame, a value of nB is less than a value of a first discontinuous reception period, and the first discontinuous reception period is a period in which the UE in the coverage enhancement mode receives a paging message.

With respect to the sixth aspect or the first or second possible implementation manner of the sixth aspect, in a fourth possible implementation manner of the sixth aspect, the first radio frame parameter is nB and a first discontinuous reception period, where a value of nB is less than a value of the first discontinuous reception period, and the first discontinuous reception period is a period in which the UE in the coverage enhancement mode receives a paging message.

With respect to the sixth aspect or the first or second possible implementation manner of the sixth aspect, in a fifth possible implementation manner of the sixth aspect, the first radio frame parameter is a first discontinuous reception period, where the first discontinuous reception period is a period in which the UE in the coverage enhancement mode receives a paging message; and the processor is specifically configured to determine a PF, which meets a formula SFNmodT=0, in a system frame number SFN as the start PF, and determine a preset PO as the start PO, where T denotes the first discontinuous reception period.

With respect to the sixth aspect or the first or second possible implementation manner of the sixth aspect, in a sixth possible implementation manner of the sixth aspect, the first radio frame parameter is a first discontinuous reception period and a PF offset; and the processor is specifically configured to determine a PF, which meets a formula SFNmodT=W, in an SFN as the start PF, and determine a preset PO as the start PO, where W denotes the PF offset, and T denotes the first discontinuous reception period.

With respect to the sixth aspect or the first or second possible implementation manner of the sixth aspect, in a seventh possible implementation manner of the sixth aspect, the first radio frame parameter is a first discontinuous reception period, and a PF offset, and a first PO; and the SFNmodT=W, processor is specifically configured to determine a PF, which meets a formula in an SFN as the start PF, and determine the first PO as the start PO, where T denotes the first discontinuous reception period, and W denotes the PF offset.

With respect to the sixth aspect or any one of the first to seventh possible implementation manners of the sixth aspect, in an eighth possible implementation manner of the sixth aspect, the base station further includes: a receiver, where the transmitter is further configured to send adjustment information to the UE, where the adjustment information is used to record a correspondence between a coverage enhancement level and a grading parameter, the grading parameter is used to differentiate UEs having different coverage enhancement levels, and a coverage enhancement level of the UE corresponds to a quantity of times that the UE needs to repeatedly receive a paging message; the receiver is configured to receive the coverage enhancement level, sent by the UE, of the UE; the processor is further configured to determine a grading parameter of the UE according to the adjustment information and the coverage enhancement level of the UE; and the processor is specifically configured to determine the start PF and the start PO according to the first radio frame parameter and the grading parameter of the UE; or the transmitter is specifically configured to send the paging message to the UE according to the start PF, the start PO, the first subframe set, and the grading parameter of the UE.

With respect to the eighth possible implementation manner of the sixth aspect, in a ninth possible implementation manner of the sixth aspect, the grading parameter includes: a radio network temporary identity RNTI, or a PO offset, or a paging frame PF group, or a PO group, where the PF group is used to record a PF corresponding to one coverage enhancement level, and the PO group is used to record one PO corresponding to the coverage enhancement level.

With respect to the ninth possible implementation manner of the sixth aspect, in a tenth possible implementation manner of the sixth aspect, the grading parameter includes: the RNTI, where the transmitter is specifically configured to send the paging message in the start PO of the start PF and in a subframe in the first subframe set according to the RNTI of the UE.

With respect to the ninth possible implementation manner of the sixth aspect, in an eleventh possible implementation manner of the sixth aspect, the grading parameter includes: the PO offset, where the processor is specifically configured to determine a first PF and the first PO according to the first radio frame parameter; and the processor is specifically configured to: determine, as the start PF and the start PO, a corresponding PF and PO that are obtained after an offset of subframes whose quantity equals the PO offset of the UE and in which the paging message can be received is performed starting with the first PO of the first PF.

With respect to the ninth possible implementation manner of the sixth aspect, in a twelfth possible implementation manner of the sixth aspect, the grading parameter includes: the PF group, where the processor is specifically configured to determine a first PF and the first PO according to the first radio frame parameter; and the processor is specifically configured to determine the first PF and the first PO of a PF corresponding to the PF group of the UE as the start PF and the start PO.

With respect to the ninth possible implementation manner of the sixth aspect, in a thirteenth possible implementation manner of the sixth aspect, the grading parameter includes: the PO group, where the processor is specifically configured to determine a first PF according to the first radio frame parameter; and the processor is specifically configured to determine the first PF and a PO corresponding to the PO group of the UE as the start PF and the start PO.

With respect to the sixth aspect or any one of the first to thirteenth possible implementation manners of the sixth aspect, in a fourteenth possible implementation manner of the sixth aspect, the receiver is further configured to receive information, about a camp-on cell, sent by the UE and/or paging enhancement information, where the camp-on cell is a cell to which the UE is currently connected, and the paging enhancement information is used to indicate the coverage enhancement level of the UE.

According to a seventh aspect, an embodiment of the present invention provides a paging system, including: user equipment UE and a base station, where the user equipment UE is the UE according to the foregoing embodiment; and the base station is the base station according to the foregoing embodiment.

For the paging method, apparatus, and system provided in the embodiments of the present invention, UE receives a broadcast message sent by a base station, and next, determines whether the UE is UE, that is, first UE, in a coverage enhancement mode. When the UE determines that the UE is the first UE, the UE and the base station both determine a start paging frame PF and a start paging occasion PO according to a first radio frame parameter, and determine a first subframe set according to the start PF and the start PO. Finally, the base station sends a paging message to the UE according to the start PF, the start PO, and the first subframe set, and the UE receives the paging message according to the start PF, the start PO, and the first subframe set. In this way, because a first radio frame parameter is set, UE in a coverage enhancement mode may be enabled to receive only one paging message in one subframe, thereby implementing paging of UE in an area with relatively poor signal coverage.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figures 1, 2, 3:
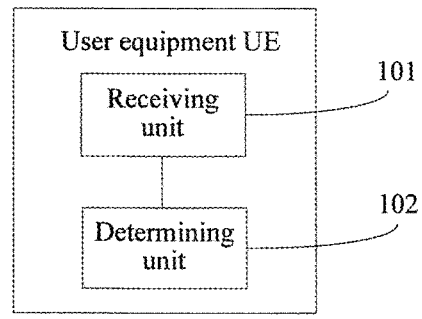
FIG. 1 is a schematic function diagram of user equipment UE according to an embodiment of the present invention.
FIG. 2 is a schematic diagram of a fixed mapping relationship of a PO according to an embodiment of the present invention.
FIG. 3 is a schematic diagram of a fixed mapping relationship of a PO according to an embodiment of the present invention.

As shown in FIG. 1, FIG. 1 is a schematic function diagram of user equipment UE (user equipment, user equipment) according to an embodiment of the present invention. Referring to FIG. 1, the UE includes: a receiving unit 101 and a determining unit 102.

The receiving unit 101 is configured to receive a broadcast message sent by a base station.

The broadcast message includes: a first radio frame parameter.

It should be noted that, the first radio frame parameter is a parameter that enables all UEs in a coverage enhancement mode in the coverage of the base station to have a same determined start paging frames PF and a same determined start paging occasions PO, or, the first radio frame parameter is a parameter that enables a difference between determined start paging occasions PO of determined start paging frame PFs of every two UEs of all UEs in a coverage enhancement mode in the coverage of the base station to be greater than a preset threshold.

It should be noted that, according to a different parameter carried in the first radio frame parameter, a method for determining a start PF and a start PO according to the first radio frame parameter is different, which further results in two cases of determined start PFs and start POs of all UEs in the coverage enhancement mode. When the first radio frame parameter includes nB, a start PF and a start PO of each of all UEs in the coverage enhancement mode are determined according to the existing standard 36.304, and a difference between the determined start POs of the determined start PFs of every two of all UEs is greater than preset threshold, as shown in a first case or a second case in the following. In this way, a quantity of subframes in which a paging message can be received and that are between the start POs of the start PFs of any two UEs in the coverage enhancement mode is increased, so that a subframe in which either UE repeatedly receives a paging message may fall within the start POs of the start PFs of two UEs, to cause the UE to receive, in one PO, only one paging message for the UE in the coverage enhancement mode, thereby further resolving a disadvantage in the prior art that UE receives two paging messages in a same PO and therefore cannot successfully parse out a paging message of the UE, so as to implement successful paging of the UE in the coverage enhancement mode. When the first radio frame parameter does not include nB, start PFs and start POs, of all UEs in the coverage enhancement mode, that are determined by using the method of the present invention are same, as shown in any one of a third case to a fifth case in the following. In this case, because the determined start PFs and the determined start POs of all the UEs in the coverage enhancement mode are same, one paging message may be used to carry paging of all the UEs in the coverage enhancement mode. In this way, one UE in the coverage enhancement mode receives only one paging message in one PO, thereby further resolving a disadvantage in the prior art that UE receives two paging messages in a same PO and therefore cannot successfully parse out a paging message of the UE, so as to implement successful paging of the UE in the coverage enhancement mode.

It should be noted that, UE in the coverage enhancement mode receives a paging message by using a first discontinuous reception period, and UE that is not in the coverage enhancement mode receives a paging message by using a second discontinuous reception period.

It should be noted that, according to whether the first radio frame parameter includes a first discontinuous reception period, a value of the first discontinuous reception period and a value of the second discontinuous reception period may be equal or may be unequal. When the first radio frame parameter does not include a first discontinuous reception period, a value of the first discontinuous reception period and a value of the second discontinuous reception period are equal, as shown in the first case in the following. When the first radio frame parameter includes a first discontinuous reception period, a value of the first discontinuous reception period and a value of the second discontinuous reception period are unequal, but the value of the first discontinuous reception period and the value of the second discontinuous reception period do not have a fixed value relationship, as shown in any one of the second case to the fifth case in the following.

It should be noted that, there are the following five cases of the first radio frame parameter: In the first case, the first radio frame parameter is nB, where nB is used to determine a quantity of paging occasions in each paging frame, a value of nB is less than a value of a first discontinuous reception period, and the first discontinuous reception period is a period in which UE in the coverage enhancement mode receives a paging message. In the second case, the first radio frame parameter is nB and a first discontinuous reception period. In the third case, the first radio frame parameter is a first discontinuous reception period. In the fourth case, the first radio frame parameter is a first discontinuous reception period and a PF offset. In the fifth case, the first radio frame parameter is a first discontinuous reception period, and a PF offset, and a first PO.

The determining unit 102 is configured to determine whether the UE is first UE.

The first UE is UE in the coverage enhancement mode. The coverage enhancement mode is a mode in which a paging message sent by the base station needs to be repeatedly received.

It should be noted that, when UE is in an area with relatively poor signal coverage, the UE may have an extra signal loss, and to compensate for such a loss, a paging message may be repeatedly sent to the UE to perform successful paging of the UE. In this case, the UE in such a mode is defined to be UE in the coverage enhancement mode.

It should be noted that, when the UE determines whether the UE is the first UE, the UE may compare signal strength of the UE with a signal strength threshold value preset in a system, to determine whether the UE is in the coverage enhancement mode. When the signal strength of the UE is less than the signal strength threshold value preset in the system, the UE determines that the UE is in the coverage enhancement mode, that is, the UE is the first UE. It may also be that the UE is UE that can obtain a broadcast message of the system in only a manner of repeated reception. The present invention is not limited thereto.

The determining unit 102 is further configured to: in a case in which it is determined that the UE is the first UE, determine a start PF and a start PO according to the first radio frame parameter.

It should be noted that, each UE has a start PF and a start PO of the UE, and the start PO of the start PF is a subframe in which the UE receives a paging message for the first time. The start PO of the start PF is a subframe in which a paging message can be received and that is in each frame in the prior art.

It should be noted that, one UE may correspond to one or more start PFs in one discontinuous period.

It should be noted that, in any one of a first case to a fifth case in the following, one or more PFs in a first discontinuous reception period may be calculated. When only one PF is calculated, a start PF in which the base station sends a paging message to the UE in the coverage enhancement mode is a PF calculated in a first discontinuous reception period, and a start PF in which the base station sends another paging message to the UE is a PF calculated in a second first discontinuous reception period. When multiple PFs are calculated, a start PF in which the base station sends a paging message to the UE in the coverage enhancement mode is a first PF calculated in the first discontinuous reception period, and a start PF in which the base station sends another paging message to the UE is a second PF calculated in the first discontinuous reception period.

It should be noted that, according to a different first radio frame parameter, a method of determining, by the UE, a start PF and a start PO according to the first radio frame parameter is different.

Further, according to a different specific case of the first radio frame parameter, there are several cases of specific application of the determining unit 102 as follows:

In the first case, when the first radio frame parameter is nB:

The determining unit 102 is specifically configured to calculate a value of a PF according to a formula $SFN\,mod\,T = (T/N) \times (UE\_ID\,mod\,N)$. A value of any SFN (System Frame Number, system frame number) that meets the formula is a value of the PF. A value range of the SFN is 0-1023. T is a parameter of DRX (Discontinuous Reception, discontinuous reception mechanism), and denote a first discontinuous reception period, a value of which is 32, or 64, or 128, or 256. N=min (T, nB), and a value of nB is T/2, or T/4, or T/8, or T/16, or T/32. UE_ID=IMS Imod1024, and IMSI (International Mobile Subscriber Identity, International Mobile Subscriber Identity) is an IMSI of the UE. After the PF is calculated, the base station calculates a value of i_s according to a formula i_s=floor (UE_ID/N) mod Ns where a value of Ns is 1, or 2, or 4; and floor is an algorithm of obtaining a maximum integer less than UE_ID/N. Next, according to a fixed mapping relationship between i_s and Ns and PO in an FDD (Frequency Division Duplexing, frequency division duplexing) system shown in FIG. 2, or according to a fixed mapping relationship between i_s and Ns and PO in a TDD (Time Division Duplexing, time division duplexing) system shown in FIG. 3, the value of the PO is determined. Finally, the UE determines all calculated PFs and a calculated PO as start PFs and a start PO.

In the second case, when the first radio frame parameter is nB and a first discontinuous reception period:

It should be noted that, a method of determining, by the determining unit 102, a start PF and a start PO according to the first radio frame parameter is the same as the method in the first case, and details are no longer described herein.

In the third case, when the first radio frame parameter is a first discontinuous reception period:

The determining unit 102 is specifically configured to determine a PF, which meets a formula SFNmodT=0, in a system frame number SFN as the start PF, and determine a preset PO as the start PO.

T denotes the first discontinuous reception period.

Specifically, the determining unit 102 calculates the value of the PF according to the formula SFNmodT=0. A value of any SFN that meets the formula is a value of a start PF. A value range of the SFN is 0-1023. T denotes the first discontinuous reception period. After the PF is calculated, the UE determines the system preset PO as the start PO.

In the fourth case, when the first radio frame parameter is a first discontinuous reception period and a PF offset:

The determining unit 102 is specifically configured to determine a PF, which meets a formula SFNmodT=W, in an SFN as the start PF, and determine a preset PO as the start PO; W denotes the PF offset.

Specifically, the determining unit 102 calculates the value of the PF according to the formula SFNmodT=W. A value of any SFN that meets the formula is a value of a start PF. A value range of the SFN is 0-1023. T denotes the first discontinuous reception period. After the PF is calculated, the UE determines the system preset PO as the start PO.

In the fifth case, when the first radio frame parameter is a first discontinuous reception period, and a PF offset, and a first PO:

The determining unit 102 is specifically configured to determine a PF, which meets a formula SFNmodT=W, in an SFN as the start PF, and determine the first PO as the start PO.

Specifically, the determining unit 102 calculates the value of the PF according to the formula SFNmodT=W. A value of any SFN that meets the formula is a value of a start PF. A value range of the SFN is 0-1023. T denotes the first discontinuous reception period; W denotes the PF offset. After the PF is calculated, the UE determines a first PO as the start PO.

It should be noted that, the first PO may be one PO in one PF, or may be multiple POs in one PF. The present invention is not limited thereto.

The determining unit 102 is further configured to determine a first subframe set according to the start PF and the start PO.

The first subframe set includes M first subframes in which the paging message can be received and that follow the start PO of the start PF. M is a quantity of times that the UE needs to repeatedly receive the paging message.

Specifically, the determining unit 102 uses the start PO of the start PF as a reference, and determines, consecutive M subframes in which a paging message can be received and that follow the start PO of the start PF as a first subframe, where a set of these subframes is referred to as a first subframe set.

Further, the first subframe is a subframe, other than a multicast broadcast single frequency network MBSFN (multicast broadcast single frequency network, multicast broadcast single frequency network) subframe, in each frame; or the first subframe is a subframe whose sequence number is 0 or 4 or 5 or 9 in each frame; or the first subframe is a subframe whose sequence number is 0 or 1 or 5 or 6 in each frame.

It should be noted that, in whichever communications system, the first subframe must be a subframe, other than the MBSFN subframe, in each frame.

Further, when the communications system is an FDD (Frequency Division Duplexing, frequency division duplexing) system, the first subframe may be a subframe whose sequence number is 0 or 4 or 5 or 9 in each frame in the first discontinuous reception period. When the communications system is a TDD (Time Division Duplexing, time division duplexing) system, the first subframe set may be a subframe whose sequence number is 0 or 1 or 5 or 6 in each frame in the first discontinuous reception period.

It should be noted that, subframes 0, 4, 5, and 9 in the FDD system are subframes that may be used to transmit a paging message in the prior art. Subframes 0, 1, 5, and 6 in the TDD system are subframes that may be used to transmit a paging message in the prior art.

The receiving unit 101 is further configured to receive, according to the start PF, the start PO, and the first subframe set, the paging message sent by the base station.

Specifically, the receiving unit 101 receives, in the start PO of the start PF and each subframe in the first subframe set, the paging message sent by the base station.

It should be noted that, the repeatedly received paging message refers to a paging message received by the UE other than the paging message received in a start PO of a start PF.

It should be noted that, a process in which the receiving unit 101 receives, in the first subframe set in each subframe, the paging message sent by the base station is the same as a process in which the receiving unit 101 receives, in the start PO of the start PF, the paging message sent by the base station.

Further, the broadcast message further includes: a second radio frame parameter. A value of the second radio frame parameter is different from a value of the first radio frame parameter.

The determining unit 102 is further configured to: in a case in which it is determined that the UE is not the first UE, determine a second subframe according to the second radio frame parameter.

It should be noted that, when the determining unit 102 determines that the UE is not the first UE, the UE only needs to determine the second subframe according to the second radio frame parameter by using a calculation method in the prior art.

It should be noted that, the second radio frame parameter is a parameter that needs to be sent by the base station to the UE when the PF and the PO of the UE are determined according to the standard 36.304 in the prior art.

The receiving unit 101 is further configured to receive, in the second subframe, a second paging message sent by the base station.

Figure 4:
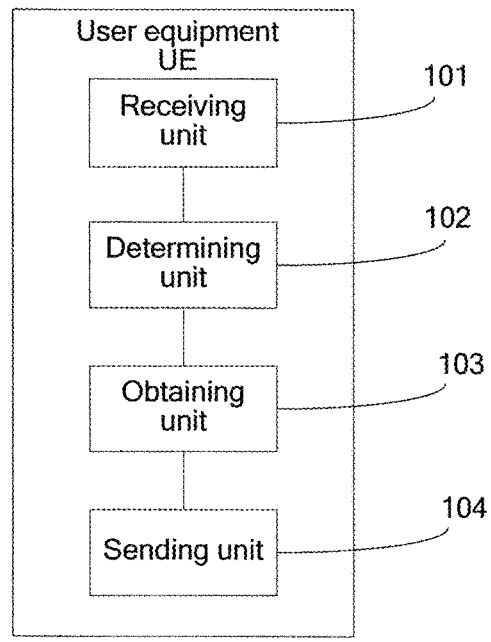
FIG. 4 is a schematic function diagram of another user equipment UE according to an embodiment of the present invention.

Further, as shown in FIG. 4, the UE further includes: an obtaining unit 103 and a sending unit 104.

The obtaining unit 103 is configured to obtain adjustment information.

The adjustment information is used to record a correspondence between a coverage enhancement level and a grading parameter, the grading parameter is used to differentiate UEs having different coverage enhancement levels, and a coverage enhancement level of the UE corresponds to a quantity of times that the UE receives a paging message.

It should be noted that, when coverage enhancement modes of UEs are not classified according to a level, all UEs receive a paging message according to a maximum quantity of times that a paging message needs to be repeatedly received. In this way, for UE that does not need to receive a paging message according to a maximum quantity of times of receiving a paging message repeatedly, many resources are wasted. Therefore, on such a basis, according to a different coverage enhancement level of UE, different adjustment information is provided to the UE, so that for UE having a different coverage enhancement level, a quantity of times of sending a paging message is different.

Further, according to a different setting of the system, there are specifically two application cases of the obtaining unit 103:

First, the obtaining unit 103 is specifically configured to receive the adjustment information sent by the base station.

It should be noted that, the base station may add the adjustment information to the broadcast message and send the adjustment information and the first radio frame parameter together to the UE, or may add the adjustment information to another message, for example, another broadcast message or an RRC message, sent from the base station to the UE and send the adjustment information. Which message the base station uses to carry the adjustment information is not limited in the present invention.

It should be noted that, the adjustment information records all coverage enhancement levels and a grading parameter corresponding to each coverage enhancement level, and therefore the base station sends the adjustment information to all UEs in the coverage enhancement mode.

Second, the obtaining unit 103 is specifically configured to obtain the prestored adjustment information locally.

It should be noted that, in this case, the adjustment information is recorded in each UE when the system is established.

Further, the grading parameter includes: an RNTI (Radio Network Temporary Identity, radio network temporary identity), or a PO offset, or a PF group, or a PO group. The PF group is used to record a PF corresponding to one coverage enhancement level. The PO group is used to record one PO corresponding to the coverage enhancement level.

The obtaining unit 103 is further configured to obtain the coverage enhancement level of the UE.

The sending unit 104 is configured to send the coverage enhancement level to the base station.

The determining unit 102 is further configured to determine a grading parameter of the UE according to the adjustment information and the coverage enhancement level of the UE.

It should be noted that, the determining unit 102 finds, in the adjustment information, a record having a same coverage enhancement level as the UE, and obtains an adjustment parameter of the UE according to a one-to-one correspondence between a coverage enhancement level and an adjustment parameter.

In this case, the receiving unit 101 is specifically configured to receive, according to the start PF, the start PO, the first subframe set, and the grading parameter of the UE, the paging message sent by the base station.

Specifically, the grading parameter includes: the RNTI, where the receiving unit 101 is specifically configured to receive, in the start PO of the start PF and in a subframe in the first subframe set according to the RNTI of the UE, the paging message sent by the base station.

Alternatively:

In this case, the determining unit 102 is specifically configured to determine the start PF and the start PO according to the first radio frame parameter and the grading parameter of the UE.

Specifically, the grading parameter includes: the PO offset, where the determining unit 102 is specifically configured to determine a first PF and a first PO according to the first radio frame parameter. The determining unit 102 is specifically configured to: determine, as the start PF and the start PO, a corresponding PF and PO that are obtained after an offset of subframes whose quantity equals the PO offset of the UE and in which the paging message can be received is performed starting with the first PO of the first PF.

The grading parameter includes: the PF group, where the determining unit 102 is specifically configured to determine a first PF and the first PO according to the first radio frame parameter. The determining unit 102 is specifically configured to determine the first PF and the first PO of a PF corresponding to the PF group of the UE as the start PF and the start PO.

The grading parameter includes: the PO group, where the determining unit 102 is specifically configured to determine a first PF according to the first radio frame parameter. The determining unit 102 is specifically configured to determine the first PF and a PO corresponding to the PO group of the UE as the start PF and the start PO.

Figure 5:
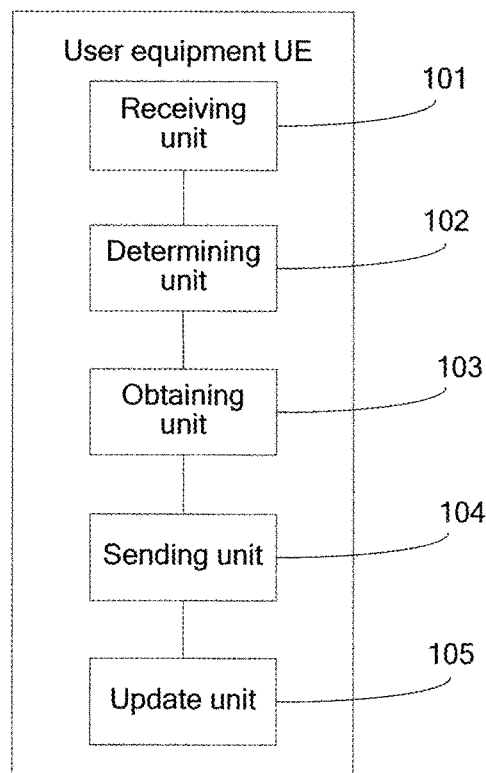
FIG. 5 is a schematic function diagram of another user equipment UE according to an embodiment of the present invention.

Further, as shown in FIG. 5, the UE further includes: an update unit 105.

The update unit 105 is configured to update information about a camp-on cell and/or paging enhancement information.

The camp-on cell is a cell to which the UE is currently connected, and the paging enhancement information is used to indicate the coverage enhancement level of the UE.

The sending unit 104 is further configured to send the updated information about the camp-on cell and/or the updated paging enhancement information to the base station.

For the user equipment UE provided in this embodiment of the present invention, the UE receives a broadcast message sent by a base station, and next, determines whether the UE is UE, that is, first UE, in a coverage enhancement mode. When the UE determines that the UE is the first UE, the UE determines a start paging frame PF and a start paging occasion PO according to a first radio frame parameter, determines a first subframe set according to the start PF and the start PO, and finally receives, according to the start PF, the start PO, and the first subframe set, the paging message sent by the base station. In this way, because a first radio frame parameter is set, UE in a coverage enhancement mode may be enabled to receive only one paging message in one subframe, thereby implementing paging of UE in an area with relatively poor signal coverage.

Figure 6:
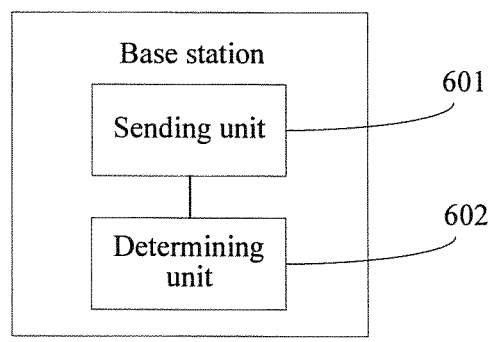
FIG. 6 is a schematic function diagram of a base station according to an embodiment of the present invention.

As shown in FIG. 6, FIG. 6 is a schematic function diagram of a base station according to an embodiment of the present invention. Referring to FIG. 6, the base station includes: a sending unit 601 and a determining unit 602.

The sending unit 601 is configured to send a broadcast message to user equipment UE.

The broadcast message includes: a first radio frame parameter.

Further, the broadcast message further includes: a second radio frame parameter. A value of the second radio frame parameter is different from a value of the first radio frame parameter.

It should be noted that, the second radio frame parameter is a parameter that enables UE that is not in a coverage enhancement mode in the coverage of the base station to determine a start PF and a start PO.

It should be noted that, the sending unit 601 sends the first radio frame parameter and the second radio frame parameter to all UEs served by the base station, and UE that receives the broadcast message determines, according to whether the UE is UE in a coverage enhancement mode, whether to use the first radio frame parameter or the second radio frame parameter, where when the UE determines that the UE is in the coverage enhancement mode, the UE uses the first radio frame parameter; and when the UE determines that the UE is not in the coverage enhancement mode, the UE uses the second radio frame parameter.

It should be noted that, all UEs in the coverage enhancement mode use the same first radio frame parameter.

It should be noted that, the first radio frame parameter is a parameter that enables all UEs in a coverage enhancement mode in the coverage of the base station to have a same determined start paging frames PF and a same determined start paging occasions PO, or, the first radio frame parameter is a parameter that enables a difference between determined start paging occasions PO of determined start paging frame PFs of every two UEs of all UEs in a coverage enhancement mode in the coverage of the base station to be greater than a preset threshold.

It should be noted that, according to a different parameter carried in the first radio frame parameter, a method for determining a start PF and a start PO according to the first radio frame parameter is different, which further results in two cases of determined start PFs and start POs of all UEs in the coverage enhancement mode. When the first radio frame parameter includes nB, a start PF and a start PO of each of all UEs in the coverage enhancement mode are determined according to the existing standard 36.304, and a difference between the determined start POs of the determined start PFs of every two of all UEs is greater than preset threshold, as shown in a first case or a second case in the following. In this way, a quantity of subframes in which a paging message can be sent and that are between the start POs of the start PFs of any two UEs in the coverage enhancement mode is increased, so that a subframe in which either UE repeatedly sends a paging message may fall within the start POs of the start PFs of two UEs, to cause the base station to send only one paging message for UE in the coverage enhancement mode in one PO, thereby further resolving a disadvantage in the prior art that UE receives two paging messages in a same PO and therefore cannot successfully parse out a paging message of the UE, so as to implement successful paging of the UE in the coverage enhancement mode. When the first radio frame parameter does not include nB, start PFs and start POs, of all UEs in the coverage enhancement mode, that are determined by using the method of the present invention are same, as shown in any one of a third case to a fifth case in the following. In this case, because the determined start PFs and the determined start POs of all the UEs in the coverage enhancement mode are same, one paging message may be used to carry paging of all the UEs in the coverage enhancement mode. In this way, one UE in the coverage enhancement mode receives only one paging message in one PO, thereby further resolving a disadvantage in the prior art that UE receives only two paging messages in a same PO and therefore cannot successfully parse out a paging message of the UE, so as to implement successful paging of the UE in the coverage enhancement mode.

It should be noted that, UE in the coverage enhancement mode receives a paging message by using a first discontinuous reception period, and UE that is not in the coverage enhancement mode receives a paging message by using a second discontinuous reception period.

It should be noted that, according to whether the first radio frame parameter includes a first discontinuous reception period, a value of the first discontinuous reception period and a value of the second discontinuous reception period may be equal or may be unequal. When the first radio frame parameter does not include a first discontinuous reception period, a value of the first discontinuous reception period and a value of the second discontinuous reception period are equal, as shown in the first case in the following. When the first radio frame parameter includes a first discontinuous reception period, a value of the first discontinuous reception period and a value of the second discontinuous reception period are unequal, but the value of the first discontinuous reception period and the value of the second discontinuous reception period do not have a fixed value relationship, as shown in any one of the second case to the fifth case in the following.

Further, the first radio frame parameter includes five cases: In the first case, the first radio frame parameter is nB, where nB is used to determine a quantity of paging occasions in each paging frame, a value of nB is less than a value of a first discontinuous reception period, and the first discontinuous reception period is a period in which the UE in the coverage enhancement mode receives a paging message. In the second case, the first radio frame parameter is nB and a first discontinuous reception period. In the third case, the first radio frame parameter is a first discontinuous reception period. In the fourth case, the first radio frame parameter is a first discontinuous reception period and a paging frame PF offset. In the fifth case, the first radio frame parameter is a first discontinuous reception period, a PF offset, and a first paging occasion PO.

The determining unit 602 is configured to determine whether the UE is first UE.

The first UE is UE in the coverage enhancement mode. The coverage enhancement mode is a mode in which the base station needs to repeatedly send a paging message.

The determining unit 602 is further configured to: in a case in which it is determined that the UE is the first UE, determine a start PF and a start PO according to the first radio frame parameter.

The determining unit 602 is further configured to determine a first subframe set according to the start PF and the start PO.

The first subframe set includes M first subframes in which the paging message can be sent and that follow the start PO of the start PF. M is a quantity of times that the base station needs to repeatedly send the paging message.

Further, the first subframe is a subframe, other than a multicast broadcast single frequency network MBSFN subframe, in each frame; or the first subframe is a subframe whose sequence number is 0 or 4 or 5 or 9 in each frame; or the first subframe is a subframe whose sequence number is 0 or 1 or 5 or 6 in each frame.

Specifically, the first radio frame parameter is a first discontinuous reception period, where the first discontinuous reception period is a period in which the UE in the coverage enhancement mode receives a paging message; and the determining unit 602 is specifically configured to determine a PF, which meets a formula SFNmodT=0, in a system frame number SFN as the start PF, and determine a preset PO as the start PO, where T denotes the first discontinuous reception period.

Specifically, the first radio frame parameter is a first discontinuous reception period and a PF offset; and the determining unit 602 is specifically configured to determine a PF, which meets a formula SFNmodT=W, in an SFN as the start PF, and determine a preset PO as the start PO, where W denotes the PF offset, and T denotes the first discontinuous reception period.

Specifically, the first radio frame parameter is a first discontinuous reception period, and a PF offset, and a first PO; and the determining unit 602 is specifically configured to determine a PF, which meets a formula SFNmodT=W, in an SFN as the start PF, and determine the first PO as the start PO, where T denotes the first discontinuous reception period, and W denotes the PF offset.

The sending unit 601 is further configured to send the paging message to the UE according to the start PF, the start PO, and the first subframe set.

Specifically, the sending unit 601 sends the paging message for the UE in the start PO of the start PF and in each subframe in the first subframe set.

It should be noted that, the repeatedly sent paging message refers to a paging message sent by the base station outside the start PO of the start PF.

Further, in a case in which the broadcast message further includes: the second radio frame parameter, the determining unit 602 is further configured to: in a case in which it is determined that the UE is not the first UE, determine a second subframe according to the second radio frame parameter. The sending unit 601 is further configured to send a second paging message to the UE in the second subframe.

Figure 7:
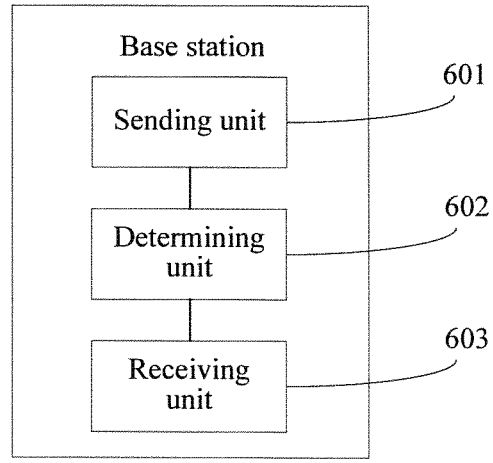
FIG. 7 is a schematic function diagram of another base station according to an embodiment of the present invention.

Further, as shown in FIG. 7, the base station further includes: a receiving unit 603.

The sending unit 601 is further configured to send adjustment information to the UE.

The adjustment information is used to record a correspondence between a coverage enhancement level and a grading parameter, the grading parameter is used to differentiate UEs having different coverage enhancement levels, and a coverage enhancement level of the UE corresponds to a quantity of times that the UE needs to repeatedly receive a paging message.

Further, the grading parameter includes: a radio network temporary identity RNTI, or a PO offset, or a paging frame PF group, or a PO group, where the PF group is used to record a PF corresponding to one coverage enhancement level, and the PO group is used to record one PO corresponding to the coverage enhancement level.

The receiving unit 603 is configured to receive the coverage enhancement level, sent by the UE, of the UE.

The determining unit 602 is further configured to determine a grading parameter of the UE according to the adjustment information and the coverage enhancement level of the UE.

The determining unit 602 is specifically configured to determine the start PF and the start PO according to the first radio frame parameter and the grading parameter of the UE.

Specifically, the grading parameter includes: the PO offset, where the determining unit 602 is specifically configured to determine a first PF and a first PO according to the first radio frame parameter; and the determining unit 602 is specifically configured to: determine, as the start PF and the start PO, a corresponding PF and PO that are obtained after an offset of subframes whose quantity equals the PO offset of the UE and in which the paging message can be received is performed starting with the first PO of the first PF.

Specifically, the grading parameter includes: the PF group, where the determining unit 602 is specifically configured to determine a first PF and the first PO according to the first radio frame parameter; and the determining unit 602 is specifically configured to determine the first PF and the first PO of a PF corresponding to the PF group of the UE as the start PF and the start PO.

Specifically, the grading parameter includes: the PO group, where the determining unit 602 is specifically configured to according to the first radio frame parameter determine the first PF; and the determining unit 602 is specifically configured to determine a first PF and a PO corresponding to the PO group of the UE as the start PF and the start PO.

Alternatively:

The sending unit 601 is specifically configured to send the paging message to the UE according to the start PF, the start PO, the first subframe set, and the grading parameter of the UE.

Specifically, the grading parameter includes: the RNTI, where the sending unit 601 is specifically configured to send the paging message in the start PO of the start PF and in a subframe in the first subframe set according to the RNTI of the UE.

Specifically, when the UE receives the paging message, the UE listens to find whether there is a PDCCH (physical downlink control channel, physical downlink control channel) scrambled by using the RNTI of the UE, and when the UE listens and detects a PDSCH scrambled by using the RNTI, it indicates that the base station sends the paging message to the UE, so that the UE receives, in the start PO of the start PF and a subframe in the first subframe set, the paging message sent by the base station.

Further, the receiving unit 603 is further configured to receive information, about a camp-on cell, sent by the UE and/or paging enhancement information.

The camp-on cell is a cell to which the UE is currently connected.

The paging enhancement information is used to indicate the coverage enhancement level of the UE.

For the base station provided in this embodiment of the present invention, the base station first sends a broadcast message to UE, and next, determines whether the UE is UE, that is, first UE, in a coverage enhancement mode. When it is determined that the UE is the first UE, the base station determines a start paging frame PF and a start paging occasion PO according to a first radio frame parameter, determines a first subframe set according to the start PF and the start PO, and finally sends a paging message according to the start PF, the start PO, and the first subframe set. In this way, because a first radio frame parameter is set, UE in a coverage enhancement mode may be enabled to receive only one paging message in one subframe, thereby implementing paging of UE in an area with relatively poor signal coverage.

Figure 8:
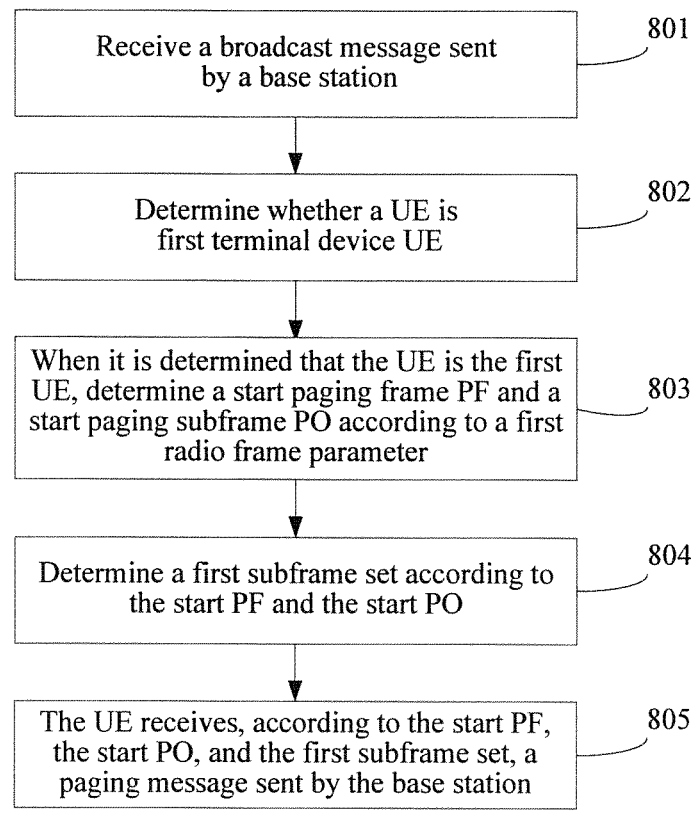
FIG. 8 is a schematic flowchart of a paging method according to an embodiment of the present invention.

An embodiment of the present invention provides a paging method. As shown in FIG. 8, the paging method includes:

801: UE receives a broadcast message sent by a base station.

The broadcast message includes: a first radio frame parameter.

It should be noted that, the first radio frame parameter is a parameter that enables all UEs in a coverage enhancement mode in the coverage of the base station to have a same determined start paging frames PF and a same determined start paging occasions PO, or, the first radio frame parameter is a parameter that enables a difference between determined start paging occasions PO of determined start paging frame PFs of every two UEs of all UEs in a coverage enhancement mode in the coverage of the base station to be greater than a preset threshold.

It should be noted that, according to a different parameter carried in the first radio frame parameter, a method for determining a start PF and a start PO according to the first radio frame parameter is different, which further results in two cases of determined start PFs and start POs of all UEs in the coverage enhancement mode. When the first radio frame parameter includes nB, a start PF and a start PO of each of all UEs in the coverage enhancement mode are determined according to the existing standard 36.304, and a difference between the determined start POs of the determined start PFs of every two of all UEs is greater than preset threshold, as shown in a first case or a second case in the following. In this way, a quantity of subframes in which a paging message can be received and that are between the start POs of the start PFs of any two UEs in the coverage enhancement mode is increased, so that a subframe in which either UE repeatedly receives a paging message may fall within the start POs of the start PFs of two UEs, to cause the UE to receive, in one PO, only one paging message for the UE in the coverage enhancement mode, thereby further resolving a disadvantage in the prior art that UE receives two paging messages in a same PO and therefore cannot successfully parse out a paging message of the UE, so as to implement successful paging of the UE in the coverage enhancement mode. When the first radio frame parameter does not include nB, start PFs and start POs, of all UEs in the coverage enhancement mode, that are determined by using the method of the present invention are same, as shown in any one of a third case to a fifth case in the following. In this case, because the determined start PFs and the determined start POs of all the UEs in the coverage enhancement mode are same, one paging message may be used to carry paging of all the UEs in the coverage enhancement mode. In this way, one UE in the coverage enhancement mode receives only one paging message in one PO, thereby further resolving a disadvantage in the prior art that UE receives two paging messages in a same PO and therefore cannot successfully parse out a paging message of the UE, so as to implement successful paging of the UE in the coverage enhancement mode.

It should be noted that, UE in the coverage enhancement mode receives a paging message by using a first discontinuous reception period, and UE that is not in the coverage enhancement mode receives a paging message by using a second discontinuous reception period.

It should be noted that, according to whether the first radio frame parameter includes a first discontinuous reception period, a value of the first discontinuous reception period and a value of the second discontinuous reception period may be equal or may be unequal. When the first radio frame parameter does not include a first discontinuous reception period, a value of the first discontinuous reception period and a value of the second discontinuous reception period are equal, as shown in the first case in the following. When the first radio frame parameter includes a first discontinuous reception period, a value of the first discontinuous reception period and a value of the second discontinuous reception period are unequal, but the value of the first discontinuous reception period and the value of the second discontinuous reception period do not have a fixed value relationship, as shown in any one of the second case to the fifth case in the following.

It should be noted that, according to different content included in the first radio frame parameter, there may be five cases:

In the first case, the first radio frame parameter is nB.

nB is used to determine a quantity of paging occasions in each paging frame, a value of nB is less than a value of a first discontinuous reception period, and the first discontinuous reception period is a period in which the UE in the coverage enhancement mode receives a paging message.

It should be noted that, in this case, discontinuous reception periods of all UEs served by the base station are the same, that is, a value of a first discontinuous reception period used by UE in the coverage enhancement mode is the same as a value of a second discontinuous reception period used by UE that is not in the coverage enhancement mode; however, the UE in the coverage enhancement mode and the UE that is not in the coverage enhancement mode have different values of radio frame parameters, and the first radio frame parameter of the UE in the coverage enhancement mode is nB.

It should be noted that, nB not only needs to meet a condition that a value of nB is less than a value of a first discontinuous reception period, but also needs to meet a limitation on the value of nB in the prior art. For example, in the prior art, the value of nB is 4T, or 2T, or T, or T/2, or T/4, or T/8, or T/16, or T/32. T denotes a first discontinuous reception period. It can be known by combining the two conditions that in this case, nB can be only T/2, or T/4, or T/8, or T/16, or T/32.

It should be noted that, in only a case in which a value of nB is less than a value of a first discontinuous reception period, paging information of all UEs that need to repeatedly receive a paging message can be carried in a same paging message and sent according to an existing algorithm, so as to avoid a case in which different UEs that repeatedly send a paging message have different start time and therefore the UEs cannot correctly receive paging message of the UEs.

It should be noted that, the first discontinuous reception period is a period in which the UE receives a paging message sent by the base station. There are multiple frames in one first discontinuous reception period, and each frame cannot be used to receive the paging message. Among all frames, a frame that can be used to receive the paging message is referred to as a PF (Paging Frame, paging frame). Similarly, one frame has ten subframes, and each subframe cannot be used to receive the paging message. A subframe that can be used to receive the paging message in the PF is referred to as a PO (Paging Occasion).

Exemplarily, in an LTE (Long Term Evolution, 3GPP Long Term Evolution) system, one first discontinuous reception period T is evenly divided into 1024 frames, and one frame is 10 ms. Further, one frame is divided into ten subframes.

It should be noted that, in this case, paging information, by the base station, of all UEs that need to repeatedly receive a paging message may be carried in a same paging message and the same paging message is sent to all the UEs that need to repeatedly receive a paging message.

In the second case, the first radio frame parameter is nB and a first discontinuous reception period.

A value of nB is less than a value of the first discontinuous reception period, and the first discontinuous reception period is a period in which the UE in the coverage enhancement mode receives a paging message.

In the third case, the first radio frame parameter is a first discontinuous reception period.

The first discontinuous reception period is a period in which the UE in the coverage enhancement mode receives a paging message.

In the fourth case, the first radio frame parameter is a first discontinuous reception period and a PF offset.

It should be noted that, the PF offset is a preset value.

In the fifth case, the first radio frame parameter is a first discontinuous reception period, and a PF offset, and a first PO.

It should be noted that, the first PO is one or more POs in each PF that are preset in a system.

802: The UE determines whether the UE is first UE.

The first UE is UE in a coverage enhancement mode. the coverage enhancement mode is a mode in which the paging message sent by the base station needs to be repeatedly received.

It should be noted that, in this embodiment, quantities of times that all UEs in the coverage enhancement mode need to repeatedly receive a paging message are the same. In this case, generally a quantity of times that a paging message is repeatedly received is set according to a maximum value of a quantity of times that each UE of all first UEs needs to repeatedly receive a paging message.

It should be noted that, when UE is in an area with relatively poor signal coverage, the UE may have an extra signal loss, and to compensate for such a loss, a paging message may be repeatedly sent to the UE to perform successful paging of the UE. In this case, the UE in such a mode is defined to be UE in the coverage enhancement mode.

It should be noted that, when the UE determines whether the UE is the first UE, the UE may compare signal strength of the UE with a signal strength threshold value preset in a system, to determine whether the UE is in the coverage enhancement mode. When the signal strength of the UE is less than the signal strength threshold value preset in the system, the UE determines that the UE is in the coverage enhancement mode, that is, the UE is the first UE. It may also be that the UE is UE that can obtain a broadcast message of the system in only a manner of repeated reception. The present invention is not limited thereto.

803: When the UE determines that the UE is the first UE, the UE determines a start PF and a start PO according to a first radio frame parameter.

It should be noted that, each UE has a start PF and a start PO of the UE, and the start PO of the start PF is a subframe in which the UE receives a paging message for the first time. The start PO of the start PF is a subframe in which a paging message can be received and that is in each frame in the prior art.

It should be noted that, one UE may correspond to one or more start PFs in one discontinuous period.

It should be noted that, in any one of a first case to a fifth case in the following, one or more PFs in a first discontinuous reception period may be calculated. When only one PF is calculated, a start PF in which the base station sends a paging message to the UE in the coverage enhancement mode is a PF calculated in a first discontinuous reception period, and a start PF in which the base station sends another paging message to the UE is a PF calculated in a second first discontinuous reception period. When multiple PFs are calculated, a start PF in which the base station sends a paging message to the UE in the coverage enhancement mode is a first PF calculated in the first discontinuous reception period, and a start PF in which the base station sends another paging message to the UE is a second PF calculated in the first discontinuous reception period.

Exemplarily, when only one PF, for example, PF1 is calculated, a start PF in which the base station sends, to the UE, a paging message for the UE from UE1 is the PF in the first discontinuous reception period, and a start PF in which the base station sends, to the UE, a paging message for the UE from UE2 is the PF in the second first discontinuous reception period. When two PFs, for example, PF1 and PF2, are calculated, a start PF in which the base station sends, to the UE, a paging message for the UE from UE1 is PF1 in one first discontinuous reception period, and a start PF in which the base station sends, to the UE, the paging message for the UE from UE2 is PF2 in a same first discontinuous reception period.

It should be noted that, according to a different first radio frame parameter, a method of determining, by the UE, a start PF and a start PO according to the first radio frame parameter is different.

Specifically, there may be the following five cases:

In the first case, when the first radio frame parameter is nB:

The determining, by the UE, a start PF and a start PO according to the first radio frame parameter includes:

calculating, by the UE, the value of the PF according to a formula SFNmodT=(T/N)×(UE_IDmodN), where a value of any SFN (System Frame Number, system frame number) that meets the formula is a value of the PF. A value range of the SFN is 0-1023. T is a parameter of DRX (Discontinuous Reception, discontinuous reception mechanism), and denotes a first discontinuous reception period, a value of which is 32, or 64, or 128, or 256. N=min (T, nB), and a value of nB is T/2, or T/4, or T/8, or T/16, or T/32. UE_ID=IMS Imod1024, and IMSI (International Mobile Subscriber Identity, International Mobile Subscriber Identity) is an IMSI of the UE. After the PF is calculated, the base station calculates a value of i_s according to a formula i_s=floor (UE_ID/N) mod Ns, where a value of Ns is 1, or 2, or 4; and floor is an algorithm of obtaining a maximum integer less than UE_ID/N. Next, according to a fixed mapping relationship between i_s and Ns and PO in the FDD (Frequency Division Duplexing, frequency division duplexing) system shown in FIG. 2, or according to a fixed mapping relationship between i_s and Ns and PO in the TDD (Time Division Duplexing, time division duplexing) system shown in FIG. 3, the value of the PO is determined. Finally, the UE determines all calculated PFs and a calculated PO as start PFs and a start PO.

In the second case, when the first radio frame parameter is nB and a first discontinuous reception period:

Specifically, a method of determining, by the UE, a start PF and a start PO according to the first radio frame parameter is the same as the method in the first case, and details are no longer described herein.

In the third case, when the first radio frame parameter is a first discontinuous reception period:

The determining, by the UE, a start PF and a start PO according to the first radio frame parameter includes:

The UE determines a PF, which meets a formula SFNmodT=0, in a system frame number SFN as the start PF, and determines a preset PO as the start PO.

T denotes the first discontinuous reception period.

Specifically, the UE calculates the value of the PF according to the formula SFNmodT=0. A value of any SFN that meets the formula is a value of a start PF. A value range of the SFN is 0-1023. T denotes the first discontinuous reception period. After the PF is calculated, the UE determines the system preset PO as the start PO.

In the fourth case, when the first radio frame parameter is a first discontinuous reception period and a PF offset:

The determining, by the UE, a start PF and a start PO according to the first radio frame parameter includes:

determining, by the UE a PF, which meets a formula SFNmodT=W, as the start PF, and determining a preset PO as the start PO, where W denotes the PF offset.

Specifically, the UE calculates the value of the PF according to the formula SFNmodT=W. A value of any SFN that meets the formula is a value of a start PF. A value range of the SFN is 0-1023. T denotes the first discontinuous reception period. After the PF is calculated, the UE determines the system preset PO as the start PO.

In the fifth case, when the first radio frame parameter is a first discontinuous reception period, and a PF offset, and a first PO:

The determining, by the UE, a start PF and a start PO according to the first radio frame parameter includes:

determining, by the UE, a PF, which meets a formula SFNmodT=W, in an SFN as the start PF, and determining the first PO as the start PO.

Specifically, the UE calculates the value of the PF according to the formula SFNmodT=W. A value of any SFN that meets the formula is a value of a start PF. A value range of the SFN is 0-1023. T denotes the first discontinuous reception period; and W denotes the PF offset. After the PF is calculated, the UE determines a first PO as the start PO.

It should be noted that, the first PO may be one PO in one PF, or may be multiple POs in one PF. The present invention is not limited thereto.

804: The UE determines a first subframe set according to the start PF and the start PO.

The first subframe set includes M first subframes in which the paging message can be received and that follow the start PO of the start PF. M is a quantity of times that the UE needs to repeatedly receive the paging message.

Specifically, the UE uses the start PO of the start PF as a reference, and determines, consecutive M subframes in which a paging message can be received and that follow the start PO of the start PF as a first subframe, where a set of these subframes is referred to as a first subframe set.

Further, the first subframe is a subframe, other than an MBSFN subframe, in each frame; or the first subframe is a subframe whose sequence number is 0 or 4 or 5 or 9 in each frame; or the first subframe is a subframe whose sequence number is 0 or 1 or 5 or 6 in each frame.

It should be noted that, in whichever communications system, the first subframe must be a subframe, other than the MBSFN subframe, in each frame.

Further, when the communications system is an FDD (Frequency Division Duplexing, frequency division duplexing) system, the first subframe may be a subframe whose sequence number is 0 or 4 or 5 or 9 in each frame in the first discontinuous reception period. When the communications system is a TDD (Time Division Duplexing, time division duplexing) system, the first subframe set may be a subframe whose sequence number is 0 or 1 or 5 or 6 in each frame in the first discontinuous reception period.

It should be noted that, subframes 0, 4, 5, and 9 in the FDD system are subframes that may be used to transmit a paging message in the prior art. Subframes 0, 1, 5, and 6 in the TDD system are subframes that may be used to transmit a paging message in the prior art.

Exemplarily, when the system is the FDD system, the system is set to be that a paging message can be received in only subframes 0, 4, 5, and 9. A start PO of a start PF that is determined by the UE according to the first radio frame parameter is a subframe whose sequence number is 4 in a third frame, and a quantity of times that the UE needs to repeatedly receive a paging message is 50. Starting from the subframe whose sequence number is 4 in the third frame, after the subframe whose sequence number is 4, a first subframe in which a paging message can be transmitted, that is, a subframe whose sequence number is 5 in the third frame is determined as the first subframe. Still starting from the subframe whose sequence number is 5 in the third frame, after the subframe whose sequence number is 5, a first subframe in which a paging message can be received, that is, a subframe whose sequence number is 9 in the third frame is determined as the second first subframe. Still starting from the subframe whose sequence number is 9 in the third frame, after the subframe whose sequence number is 9, a first subframe in which a paging message can be transmitted, that is, a subframe whose sequence number is 0 in a fourth frame is determined as the third first subframe. Such a process is repeated till the fiftieth first subframe is determined from the first subframe set, and the determined fifty first subframes are determined as the first subframe set.

805: The UE receives, according to the start PF, the start PO, and the first subframe set, a paging message sent by the base station.

Specifically, the UE receives, in the start PO of the start PF and in each subframe in the first subframe set, the paging message sent by the base station.

It should be noted that, the repeatedly received paging message refers to a paging message received by the UE other than the paging message received in a start PO of a start PF.

It should be noted that, a process in which the UE receives, in each subframe in the first subframe set, the paging message sent by the base station is the same as a process in which the UE receives, in the start PO of the start PF, the paging message sent by the base station.

For the paging method provided in this embodiment of the present invention, UE receives a broadcast message sent by a base station, and next, determines whether the UE is UE, that is, first UE, in a coverage enhancement mode. When the UE determines that the UE is the first UE, the UE determines a start paging frame PF and a start paging occasion PO according to a first radio frame parameter, determines a first subframe set according to the start PF and the start PO, and finally receives, according to the start PF, the start PO, and the first subframe set, the paging message sent by the base station. In this way, because a first radio frame parameter is set, UE in a coverage enhancement mode may be enabled to receive only one paging message in one subframe, thereby implementing paging of UE in an area with relatively poor signal coverage.

Figure 9:
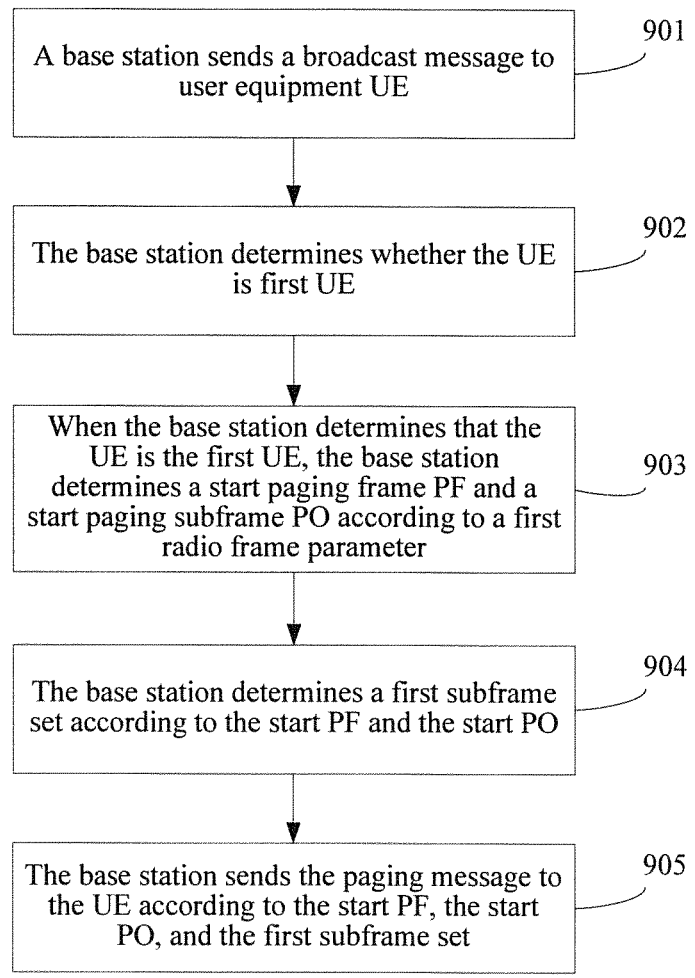
FIG. 9 a schematic flowchart of another paging method according to an embodiment of the present invention.

An embodiment of the present invention provides a paging method. As shown in FIG. 9, the paging method includes:

901: A base station sends a broadcast message to UE.

The broadcast message includes: a first radio frame parameter.

Further, the broadcast message further includes: a second radio frame parameter. A value of the second radio frame parameter is different from a value of the first radio frame parameter.

It should be noted that, the second radio frame parameter is a parameter that enables UE that is not in a coverage enhancement mode in the coverage of the base station to determine a start PF and a start PO.

It should be noted that, the base station sends the first radio frame parameter and the second radio frame parameter to all UEs served by the base station, and UE that receives the broadcast message determines, according to whether the UE is UE in a coverage enhancement mode, whether to use the first radio frame parameter or the second radio frame parameter, where when the UE determines that the UE is in the coverage enhancement mode, the UE uses the first radio frame parameter; and when the UE determines that the UE is not in the coverage enhancement mode, the UE uses the second radio frame parameter.

It should be noted that, all UEs in the coverage enhancement mode use the same first radio frame parameter.

It should be noted that, the first radio frame parameter is a parameter that enables all UEs in a coverage enhancement mode in the coverage of the base station to have a same determined start paging frames PF and a same determined start paging occasions PO, or, the first radio frame parameter is a parameter that enables a difference between determined start paging occasions PO of determined start paging frame PFs of every two UEs of all UEs in a coverage enhancement mode in the coverage of the base station to be greater than a preset threshold.

It should be noted that, according to a different parameter carried in the first radio frame parameter, a method for determining a start PF and a start PO according to the first radio frame parameter is different, which further results in two cases of determined start PFs and start POs of all UEs in the coverage enhancement mode. When the first radio frame parameter includes nB, a start PF and a start PO of each of all UEs in the coverage enhancement mode are determined according to the existing standard 36.304, and a difference between the determined start POs of the determined start PFs of every two of all UEs is greater than preset threshold, as shown in a first case or a second case in the following. In this way, a quantity of subframes in which a paging message can be sent and that are between the start POs of the start PFs of any two UEs in the coverage enhancement mode is increased, so that a subframe in which either UE repeatedly sends a paging message may fall within the start POs of the start PFs of two UEs, to cause the base station to send only one paging message for UE in the coverage enhancement mode in one PO, thereby further resolving a disadvantage in the prior art that UE receives two paging messages in a same PO and therefore cannot successfully parse out a paging message of the UE, so as to implement successful paging of the UE in the coverage enhancement mode. When the first radio frame parameter does not include nB, start PFs and start POs, of all UEs in the coverage enhancement ode, that are determined by using the method of the present invention are same, as shown in any one of a third case to a fifth case in the following. In this case, because the determined start PFs and the determined start POs of all the UEs in the coverage enhancement mode are same, one paging message may be used to carry paging of all the UEs in the coverage enhancement mode. In this way, one UE in the coverage enhancement mode receives only one paging message in one PO, thereby further resolving a disadvantage in the prior art that UE receives only two paging messages in a same PO and therefore cannot successfully parse out a paging message of the UE, so as to implement successful paging of the UE in the coverage enhancement mode.

It should be noted that, UE in the coverage enhancement mode receives a paging message by using a first discontinuous reception period, and UE that is not in the coverage enhancement mode receives a paging message by using a second discontinuous reception period.

It should be noted that, according to whether the first radio frame parameter includes a first discontinuous reception period, a value of the first discontinuous reception period and a value of the second discontinuous reception period may be equal or may be unequal. When the first radio frame parameter does not include a first discontinuous reception period, a value of the first discontinuous reception period and a value of the second discontinuous reception period are equal, as shown in the first case in the following. When the first radio frame parameter includes a first discontinuous reception period, a value of the first discontinuous reception period and a value of the second discontinuous reception period are unequal, but the value of the first discontinuous reception period and the value of the second discontinuous reception period do not have a fixed value relationship, as shown in any one of the second case to the fifth case in the following.

It should be noted that, according to different content included in the first radio frame parameter, there may be five cases:

In the first case, the first radio frame parameter is nB.

nB is used to determine a quantity of paging occasions in each paging frame, a value of nB is less than a value of a first discontinuous reception period, and the first discontinuous reception period is a period in which the UE in the coverage enhancement mode receives a paging message.

Specifically, refer to the first case in step 801, and details are no longer described herein.

In the second case, the first radio frame parameter is nB and a first discontinuous reception period.

A value of nB is less than a value of the first discontinuous reception period. The first discontinuous reception period is a period in which the UE in the coverage enhancement mode receives a paging message.

In the third case, the first radio frame parameter is a first discontinuous reception period.

The first discontinuous reception period is a period in which the UE in the coverage enhancement mode receives a paging message.

In the fourth case, the first radio frame parameter is a first discontinuous reception period and a PF offset.

It should be noted that, the PF offset is a preset value.

In the fifth case, the first radio frame parameter is a first discontinuous reception period, a PF offset, and a first PO.

It should be noted that, the first PO is one or more POs in each PF that are preset in a system.

902: The base station determines whether the UE is first UE.

The first UE is UE in a coverage enhancement mode. The coverage enhancement mode is a mode in which the base station needs to repeatedly send a paging message.

Specifically, refer to the step of determining, by the UE, whether the UE is first UE in step 802, and details are no longer described herein.

903: When the base station determines that the UE is the first UE, the base station determines a start PF and a start PO according to a first radio frame parameter.

It should be noted that, according to a different first radio frame parameter, a method of determining, by the base station, a start PF and a start PO according to the first radio frame parameter is different.

Specifically, there may be the following five cases:

In the first case, the first radio frame parameter is nB.

nB is used to determine a quantity of paging occasions in each paging frame, a value of nB is less than a value of a first discontinuous reception period, and the first discontinuous reception period is a period in which the UE in the coverage enhancement mode receives a paging message.

Specifically, refer to the first case in step 803, and details are no longer described herein.

In the second case, the first radio frame parameter is nB and a first discontinuous reception period.

A value of nB is less than a value of the first discontinuous reception period, and the first discontinuous reception period is a period in which the UE in the coverage enhancement mode receives a paging message.

Specifically, refer to the second case in step 803, and details are no longer described herein.

In the third case, the first radio frame parameter is a first discontinuous reception period.

The first discontinuous reception period is a period in which the UE in the coverage enhancement mode receives a paging message.

The determining, by the base station, a start PF and a start PO according to the first radio frame parameter includes:

determining, by the base station, a PF, which meets a formula SFNmodT=0, in a system frame number SFN as the start PF, and determining a preset PO as the start PO, where T denotes the first discontinuous reception period.

Specifically, refer to the third case in step 803, and details are no longer described herein.

In the fourth case, the first radio frame parameter is a first discontinuous reception period and a PF offset.

The determining, by the base station, a start PF and a start PO according to the first radio frame parameter includes:

determining, by the base station, a PF, which meets a formula SFNmodT=W, in an SFN as the start PF, and determining a preset PO as the start PO, where W denotes the PF offset, and T denotes the first discontinuous reception period.

Specifically, refer to the fourth case in step 803, and details are no longer described herein.

In the fifth case, the first radio frame parameter is a first discontinuous reception period, a PF offset, and a first PO.

The determining, by the base station, a start PF and a start PO according to the first radio frame parameter includes:

determining, by the base station, a PF, which meets a formula SFNmodT=W, in an SFN as the start PF, and determining the first PO as the start PO, where T denotes the first discontinuous reception period, and W denotes the PF offset.

Specifically, refer to the fifth case in step 803, and details are no longer described herein.

904: The base station determines a first subframe set according to the start PF and the start PO.

The first subframe set includes M first subframes in which the paging message can be sent and that follow the start PO of the start PF. M is a quantity of times that the base station needs to repeatedly send the paging message.

Further, the first subframe is a subframe, other than a multicast broadcast single frequency network MBSFN subframe, in each frame; or the first subframe is a subframe whose sequence number is 0 or 4 or 5 or 9 in each frame; or the first subframe is a subframe whose sequence number is 0 or 1 or 5 or 6 in each frame.

Specifically, refer to the step of determining, by the UE, a first subframe set according to the start PF and the start PO in step 804, and details are no longer described herein.

905: The base station sends a paging message to the UE according to the start PF, the start PO, and the first subframe set.

Specifically, the base station sends the paging message for the UE in the start PO of the start PF and in each subframe in the first subframe set.

It should be noted that, the repeatedly sent paging message refers to a paging message sent by the base station outside the start PO of the start PF.

It should be noted that, a process in which the base station sends the paging message in each subframe in the first subframe set is the same as a process in which the base station sends the paging message in the start PO of the start PF.

For the paging method provided in this embodiment of the present invention, a base station sends a broadcast message to UE, and next, determines whether the UE is UE, that is, first UE, in a coverage enhancement mode. When it is determined that the UE is the first UE, the base station determines a start paging frame PF and a start paging occasion PO according to a first radio frame parameter, determines a first subframe set according to the start PF and the start PO, and finally sends a paging message according to the start PF, the start PO, and the first subframe set. In this way, because a first radio frame parameter is set, UE in a coverage enhancement mode may be enabled to receive only one paging message in one subframe, thereby implementing paging of UE in an area with relatively poor signal coverage.

Figure 10:
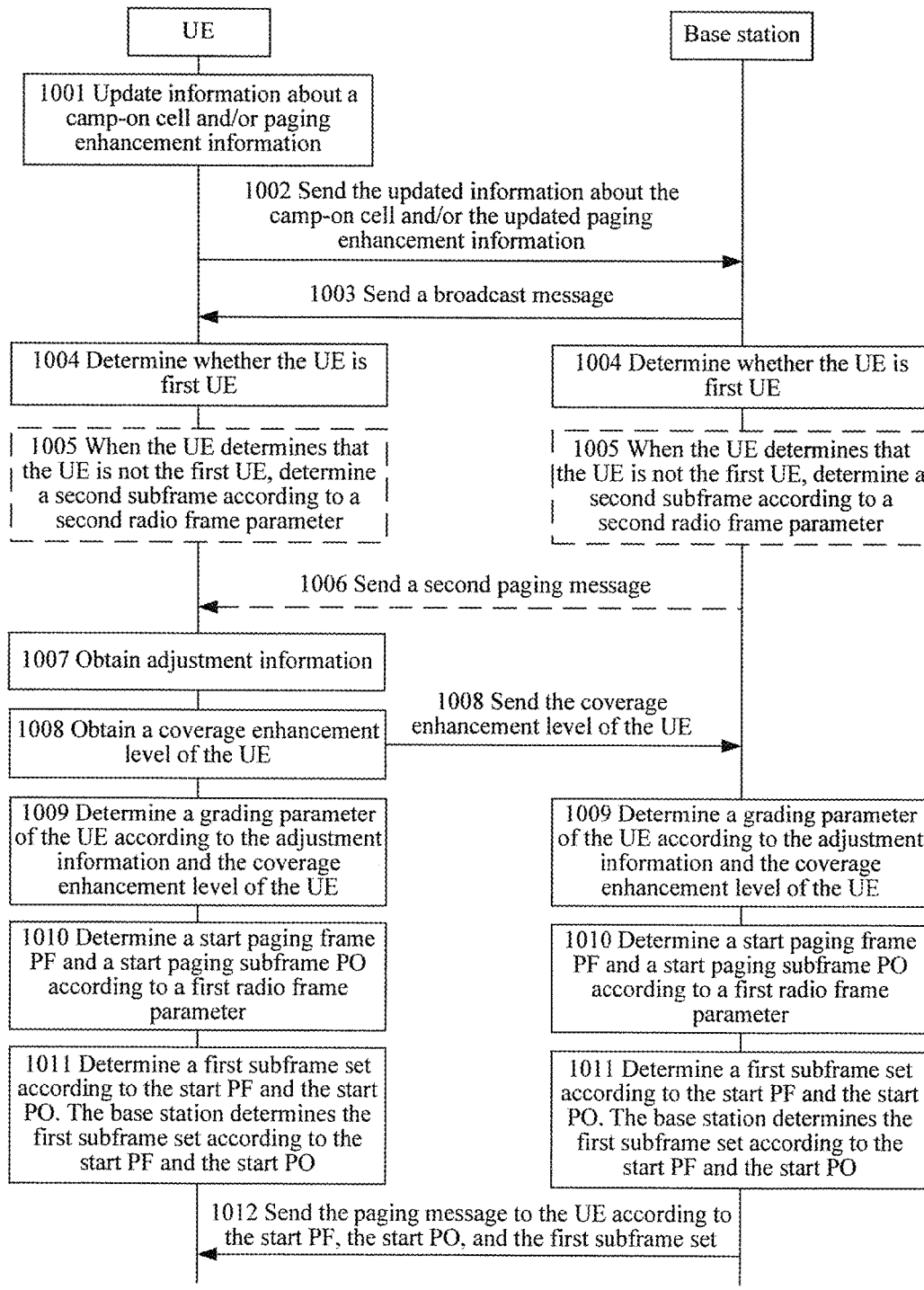
FIG. 10 is a schematic flowchart of another paging method according to an embodiment of the present invention.

An embodiment of the present invention provides a paging method. As shown in FIG. 10, the paging method includes:

1001: The UE updates information about a camp-on cell and/or paging enhancement information.

The camp-on cell is a cell to which the UE is currently connected. The paging enhancement information is used to indicate a coverage enhancement level of the UE.

It should be noted that, in this embodiment, the coverage enhancement mode of all UEs in a coverage enhancement mode is further divided into multiple paging enhancement levels. Each paging enhancement level corresponds to a quantity of times that a paging message needs to be received, and different enhancement levels correspond to different quantities of times that a paging message needs to be received.

It should be noted that, in a case without division into coverage enhancement levels, quantities of times that all UEs in the coverage enhancement mode receive a paging message are the same, and a paging message is sent according to quantities of times that successful paging of all UEs in the coverage enhancement mode can be performed. For those UEs that only need to repeatedly receive a paging message a few times, if a paging message is sent still according to a maximum quantity of times that successful paging can be performed, a lot of resources are wasted. Therefore, this embodiment proposes that for UEs in different coverage enhancement modes, according to a different paging enhancement level, a different quantity of times of sending a paging message is used, thereby further reducing a waste of resources.

Specifically, when the coverage enhancement level of the UE changes but the camp-on cell does not change, only the paging enhancement information needs to be updated. When a cell on which the UE camps changes, but the coverage enhancement level of the UE does not change, only the information about the camp-on cell needs to be updated. When both the camp-on cell and the coverage enhancement level of the UE change, the information about the camp-on cell and the paging enhancement information need to be updated.

1002: The UE sends the updated information about the camp-on cell and/or the updated paging enhancement information to a base station. The base station receives the information about the camp-on cell and/or the paging enhancement information sent by the UE.

It should be noted that, the UE sends only the updated information to the base station, that is, when the UE updates only the information about the camp-on cell, only the information about the camp-on cell needs to be sent to the base station. When the UE updates only the paging enhancement information, only the paging enhancement information needs to be sent to the base station. When the UE updates the paging enhancement information and also updates the information about the camp-on cell, the information about the camp-on cell and the paging enhancement information need to be sent to the base station.

1003: The base station sends a broadcast message to the UE. The user equipment UE receives the broadcast message sent by the base station.

Further, the broadcast message further includes: a second radio frame parameter. A value of the second radio frame parameter is different from a value of a first radio frame parameter.

Specifically, refer to step 801 and step 901, and details are no longer described herein.

1004: The UE determines whether the UE is first UE. The base station determines whether the UE is the first UE.

The first UE is UE in a coverage enhancement mode. The coverage enhancement mode is a mode in which a paging message sent by the base station needs to be repeatedly received.

Specifically, refer to step 802, and details are no longer described herein.

It should be noted that, a different step is performed according to a different determining result. When the UE is not the first UE, perform step 1005 and step 1006; and when the UE is the first UE, perform step 1007 to step 1012.

1005: When the UE determines that the UE is not the first UE, the UE determines a second subframe according to a second radio frame parameter. The base station determines the second subframe according to the second radio frame parameter.

It should be noted that, when the UE is not the first UE, the UE only needs to determine the second subframe according to the second radio frame parameter by using a calculation method in the prior art.

It should be noted that, the second radio frame parameter is a parameter that needs to be sent by the base station to the UE when the PF and the PO of the UE are determined according to the standard 36.304 in the prior art.

1006: The base station sends a second paging message to the UE in the second subframe. The UE receives, in the second subframe, the second paging message sent by the base station.

Specifically, the methods by using which the base station sends the second paging message to the UE in the second subframe and the UE receives, in the second subframe, the second paging message sent by the base station are the same as the methods in the prior art by using which the base station sends a paging message to the UE on a PO of a determined PF and the UE receives, in the PO of the calculated PF, a paging message sent by the base station, and details are no longer described herein.

1007: The UE obtains adjustment information.

The adjustment information is used to record a correspondence between a coverage enhancement level and a grading parameter, the grading parameter is used to differentiate UEs having different coverage enhancement levels, and a coverage enhancement level of the UE corresponds to a quantity of times that the UE receives a paging message.

It should be noted that, when coverage enhancement modes of UEs are not classified according to a level, all UEs receive a paging message according to a maximum quantity of times that a paging message needs to be repeatedly received. In this way, for UE that does not need to receive a paging message according to a maximum quantity of times of receiving a paging message repeatedly, many resources are wasted. Therefore, on such a basis, according to a different coverage enhancement level of UE, different adjustment information is provided to the UE, so that for UE having a different coverage enhancement level, a quantity of times of sending a paging message is different.

Exemplarily, a coverage enhancement level at which a paging message needs to be repeatedly received 50 times may be set to 1, a coverage enhancement level at which a paging message needs to be repeatedly received 100 times may be set to 2, and a coverage enhancement level at which a paging message needs to be repeatedly received 150 times may be set to 3.

Further, according to a different setting of a system, there are two methods of obtaining, by the UE, adjustment information:

First, the base station sends adjustment information to the UE. The UE receives the adjustment information sent by the base station.

It should be noted that, the base station may add the adjustment information to the broadcast message and send the adjustment information and the first radio frame parameter together to the UE, or may add the adjustment information to another message, for example, another broadcast message or an RRC message, sent from the base station to the UE and send the adjustment information. Which message the base station uses to carry the adjustment information is not limited in the present invention.

It should be noted that, the adjustment information records all coverage enhancement levels and a grading parameter corresponding to each coverage enhancement level, and therefore the base station sends the adjustment information to all UEs in the coverage enhancement mode.

Second, the UE obtains prestored adjustment information locally.

It should be noted that, in this case, the adjustment information is recorded in each UE when the system is established.

Further, the grading parameter includes: an RNTI (Radio Network Temporary Identity, radio network temporary identity), or a PO offset, or a PF group, or a PO group.

The PF group is used to record a PF corresponding to one coverage enhancement level, and the PO group is used to record one PO corresponding to the coverage enhancement level.

1008: The UE obtains a coverage enhancement level of the UE, and sends the coverage enhancement level to the base station. The base station receives the coverage enhancement level, sent by the UE, of the UE.

It should be noted that, the UE determines the coverage enhancement level of the UE according to signal strength of the UE.

1009: The UE determines a grading parameter of the UE according to the adjustment information and the coverage enhancement level of the UE. The base station determines a grading parameter of the UE according to the adjustment information and the coverage enhancement level of the UE.

It should be noted that, the UE and the base station find, in the adjustment information, a record having a same coverage enhancement level as the UE, and obtain an adjustment parameter of the UE according to a one-to-one correspondence between a coverage enhancement level and an adjustment parameter.

1010: The UE determines a start paging frame PF and a start paging occasion PO according to a first radio frame parameter. The base station determines the start PF and the start PO according to the first radio frame parameter and the grading parameter of the UE.

It should be noted that, when impact of the grading parameter is not considered, for a process of determining a start PF and a start PO according to the first radio frame parameter, refer to step 803, and details are no longer described herein.

It should be noted that, the grading parameter includes: a PO offset, or a PF group, or a PO group, and the determining a start PF and a start PO according to the first radio frame parameter includes: determining, by the UE, the start PF and the start PO according to the first radio frame parameter and the grading parameter of the UE.

Specifically, according to a specific different case of the grading parameter, there may be three cases:

In a first case, the grading parameter includes: the PO offset, and the determining, by the UE, the start PF and the start PO according to the first radio frame parameter and the grading parameter of the UE includes:

Step 1: Determine a first PF and a first PO according to the first radio frame parameter.

It should be noted that, a method of determining the first PF and the first PO according to the first radio frame parameter is the same as the method of determining, by the UE, a start PF and a start PO according to the first radio frame parameter in step 803, and details are no longer described herein.

Step 2: Determine, as the start PF and the start PO, a corresponding PF and PO that are obtained after an offset of subframes whose quantity equals the PO offset of the UE and in which the paging message can be received is performed starting with the first PO of a first PF.

It should be noted that, when the UE offsets onward starting with the first PO of the first PF, if a subframe in which a paging message cannot be received is encountered, the subframe is not counted as subframe that needs to be offset.

Exemplarily, when one frame has ten subframes whose sequence numbers are 0 to 9, where subframes whose sequence numbers are 0, 4, 5, and 9 are subframes in which a paging message can be transmitted, the subframe whose sequence number is 0 in a first frame is a first PO of a first PF, and a PO offset is 2. In this case, a start PO of a start PF is a subframe whose sequence number is 5 in the first frame instead of a subframe whose sequence number is 2 in the first frame.

In a second case, the grading parameter includes: the PF group, where the determining, by the UE, the start PF and the start PO according to the first radio frame parameter and the grading parameter of the UE includes:

Step 1: Determine a first PF and the first PO according to the first radio frame parameter.

Specifically, a method of determining the first PF and the first PO according to the first radio frame parameter is the same as the method of determining, by the UE, a start PF and a start PO according to the first radio frame parameter in step 803, and details are no longer described herein.

Step 2: Determine a first PF and the first PO of a PF corresponding to the PF group of the UE as the start PF and the start PO.

Specifically, the calculated all first PF groups and a first PO of a PF corresponding to the PF group of the UE are determined as start PFs and a start PO.

In a third case, the grading parameter includes: the PO group, and the determining, by the UE, the start PF and the start PO according to the first radio frame parameter and the grading parameter of the UE includes:

Step 1: Determine a first PF according to the first radio frame parameter.

Specifically, a method of determining the first PF according to the first radio frame parameter is the same as the method of determining, by the UE, a start PF according to the first radio frame parameter in step 803, and details are no longer described herein.

Step 2: Determine a first PF and a PO corresponding to the PO group of the UE as the start PF and the start PO.

Specifically, a calculated first PF is determined as a start PF, all POs in the first PF are grouped, and a PO, corresponding to the PO group of the UE, of all the POs, is determined as the start PO.

1011: The UE determines a first subframe set according to the start PF and the start PO. The base station determines the first subframe set according to the start PF and the start PO.

The first subframe set includes M first subframes in which the paging message can be received and that follow the start PO of the start PF. M is a quantity of times that the UE needs to repeatedly receive the paging message.

Specifically, refer to step 804, and details are no longer described herein.

1012: The base station sends the paging message to the UE according to the start PF, the start PO, and the first subframe set. The UE receives, according to the start PF, the start PO, and the first subframe set, the paging message sent by the base station.

It should be noted that, in a case in which the grading parameter is not an RNTI, the base station sends the paging message to the UE according to the start PF, the start PO, and the first subframe set, and the UE receives, according to the start PF, the start PO, and the first subframe set, the paging message sent by the base station, which are the same as step 902 and step 805, and details are no longer described herein.

Further, the grading parameter includes: the RNTI, where the UE receives, according to the start PF, the start PO, and the first subframe set, the paging message sent by the base station, and the sending, by the base station, the paging message to the UE according to the start PF, the start PO, and the first subframe set includes:

receiving, in the start PO of the start PF and in a subframe in the first subframe set according to the RNTI of the UE, the paging message sent by the base station.

Specifically, when the UE receives the paging message, the UE listens to find whether there is a PDCCH (physical downlink control channel, physical downlink control channel) scrambled by using the RNTI of the UE, and when the UE listens and detects a PDSCH scrambled by using the RNTI, it indicates that the base station sends the paging message to the UE, so that the UE receives, in the start PO of the start PF and a subframe in the first subframe set, the paging message sent by the base station.

For the paging method provided in this embodiment of the present invention, UE receives a broadcast message sent by a base station, and next, determines whether the UE is UE, that is, first UE, in a coverage enhancement mode. When the UE determines that the UE is the first UE, the UE and the base station both determine a start paging frame PF and a start paging occasion PO according to a first radio frame parameter, and determine a first subframe set according to the start PF and the start PO. Finally, the base station sends a paging message to the UE according to the start PF, the start PO, and the first subframe set, and the UE receives the paging message according to the start PF, the start PO, and the first subframe set. In this way, because a first radio frame parameter is set, UE in a coverage enhancement mode may be enabled to receive only one paging message in one subframe, thereby implementing paging of UE in an area with relatively poor signal coverage.

Figure 11:
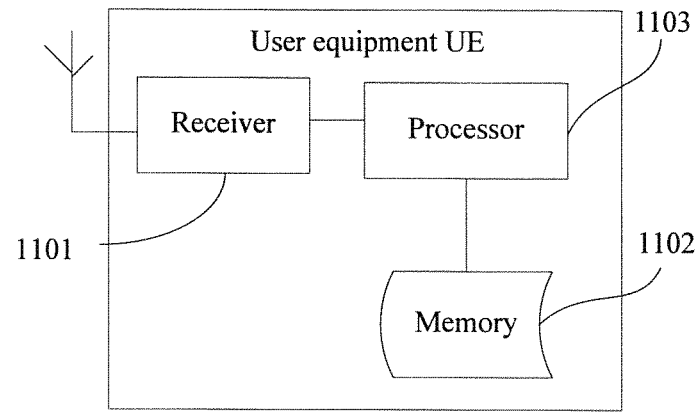
FIG. 11 is a schematic structural diagram of user equipment UE according to an embodiment of the present invention.

As shown in FIG. 11, FIG. 11 is a schematic structural diagram of user equipment UE according to an embodiment of the present invention. Referring to FIG. 11, the UE includes: a receiver 1101, a memory 1102, and a processor 1103 separately connected to the receiver 1101 and the memory 1102.

The memory 1102 stores a group of program code, and the processor 1103 is configured to invoke the program code in the memory 1102. Specifically:

The receiver 1101 is configured to receive a broadcast message sent by a base station.

The broadcast message includes: a first radio frame parameter.

It should be noted that, the first radio frame parameter includes the following five cases: In a first case, the first radio frame parameter is nB, where nB is used to determine a quantity of paging occasions in each paging frame, a value of nB is less than a value of a first discontinuous reception period, and the first discontinuous reception period is a period in which the UE in the coverage enhancement mode receives a paging message. In a second case, the first radio frame parameter is nB and a first discontinuous reception period. In a third case, the first radio frame parameter is a first discontinuous reception period. In a fourth case, the first radio frame parameter is a first discontinuous reception period and a PF offset. In a fifth case, the first radio frame parameter is a first discontinuous reception period, and a PF offset, and a first PO.

The processor 1103 is configured to determine whether the UE is first UE.

The first UE is UE in the coverage enhancement mode. The coverage enhancement mode is a mode in which a paging message sent by the base station needs to be repeatedly received.

The processor 1103 is further configured to: in a case in which it is determined that the UE is the first UE, determine a start PF and a start PO according to the first radio frame parameter.

It should be noted that, according to a different first radio frame parameter, there may be several specific application cases of the processor 1103 as follows.

First, the first radio frame parameter is a first discontinuous reception period. The processor 1103 is specifically configured to determine a PF, which meets a formula SFNmodT=0, in a system frame number SFN as the start PF, and determine a preset PO as the start PO, where T denotes the first discontinuous reception period.

Second, the first radio frame parameter is a first discontinuous reception period and a PF offset. The processor 1103 is specifically configured to determine a PF, which meets a formula SFNmodT=W, in an SFN as the start PF, and determine a preset PO as the start PO. W denotes the PF offset, where T denotes the first discontinuous reception period.

Third, the first radio frame parameter is a first discontinuous reception period, a PF offset, and a first PO. The processor 1103 is specifically configured to determine a PF, which meets a formula SFNmodT=W, in an SFN as the start PF, and determine the first PO as the start PO, where T denotes the first discontinuous reception period, and W denotes the PF offset.

The processor 1103 is further configured to determine a first subframe set according to the start PF and the start PO.

The first subframe set includes M first subframes in which the paging message can be received and that follow the start PO of the start PF. M is a quantity of times that the UE needs to repeatedly receive the paging message.

Further, the first subframe is a subframe, other than a multicast broadcast single frequency network MBSFN subframe, in each frame; or the first subframe is a subframe whose sequence number is 0 or 4 or 5 or 9 in each frame; the first subframe is a subframe whose sequence number is 0 or 1 or 5 or 6 in each frame.

The receiver 1101 is further configured to receive, according to the start PF, the start PO, and the first subframe set, the paging message sent by the base station.

Further, the broadcast message further includes: a second radio frame parameter. A value of the second radio frame parameter is different from a value of the first radio frame parameter.

In this case, the processor 1103 is further configured to: in a case in which it is determined that the UE is not the first UE, determine a second subframe according to the second radio frame parameter.

The receiver 1101 is further configured to receive, in the second subframe, a second paging message sent by the base station.

The processor 1103 is further configured to obtain adjustment information.

The adjustment information is used to record a correspondence between a coverage enhancement level and a grading parameter, the grading parameter is used to differentiate UEs having different coverage enhancement levels, and a coverage enhancement level of the UE corresponds to a quantity of times that the UE receives a paging message.

Further, the grading parameter includes: a radio network temporary identity RNTI, or a PO offset, or a PF group, or a PO group, where the PF group is used to record a PF corresponding to one coverage enhancement level, and the PO group is used to record one PO corresponding to the coverage enhancement level.

Further, the processor 1103 is specifically configured to receive the adjustment information sent by the base station; or the processor 1103 is specifically configured to obtain the prestored adjustment information locally.

The processor 1103 is further configured to obtain the coverage enhancement level of the UE.

Figure 12:
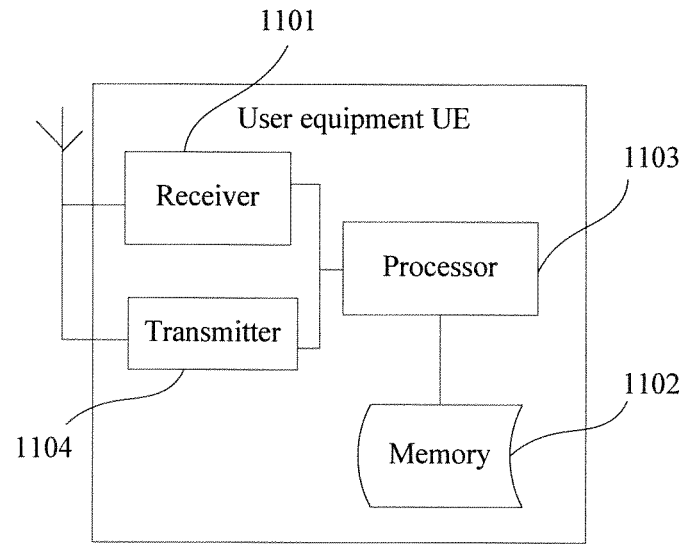
FIG. 12 is a schematic structural diagram of another user equipment UE according to an embodiment of the present invention.

Further, as shown in FIG. 12, the UE further includes: a transmitter 1104.

The transmitter 1104 is configured to send the coverage enhancement level to the base station.

The processor 1103 is further configured to determine a grading parameter of the UE according to the adjustment information and the coverage enhancement level of the UE.

In this case, the receiver 1101 is specifically configured to receive, according to the start PF, the start PO, the first subframe set, and the grading parameter of the UE, the paging message sent by the base station.

Specifically, the grading parameter includes: the RNTI, where the receiver 1101 is specifically configured to receive, in the start PO of the start PF and in a subframe in the first subframe set according to the RNTI of the UE, the paging message sent by the base station.

Alternatively:

In this case, the processor 1103 is specifically configured to determine the start PF and the start PO according to the first radio frame parameter and the grading parameter of the UE.

Specifically, the grading parameter includes: the PO offset, where the processor 1103 is specifically configured to determine a first PF and a first PO according to the first radio frame parameter. The processor 1103 is specifically configured to: determine, as the start PF and the start PO, a corresponding PF and PO that are obtained after an offset of subframes whose quantity equals the PO offset of the UE and in which the paging message can be received is performed starting with the first PO of the first PF.

Specifically, the grading parameter includes: the PF group, where the processor 1103 is specifically configured to determine a first PF and the first PO according to the first radio frame parameter. The processor 1103 is specifically configured to determine the first PF and the first PO of a PF corresponding to the PF group of the UE as the start PF and the start PO.

Specifically, the grading parameter includes: the PO group, where the processor 1103 is specifically configured to determine a first PF according to the first radio frame parameter. The processor 1103 is specifically configured to determine the first PF and a PO corresponding to the PO group of the UE as the start PF and the start PO.

The processor 1103 is further configured to update information about a camp-on cell and/or paging enhancement information.

The camp-on cell is a cell to which the UE is currently connected, and the paging enhancement information is used to indicate the coverage enhancement level of the UE.

The transmitter 1104 is further configured to send the updated information about the camp-on cell and/or the updated paging enhancement information to the base station.

For the UE provided in this embodiment of the present invention, the UE receives a broadcast message sent by a base station, and next, determines whether the UE is UE, that is, first UE, in a coverage enhancement mode. When the UE determines that the UE is the first UE, the UE determines a start paging frame PF and a start paging occasion PO according to a first radio frame parameter, determines a first subframe set according to the start PF and the start PO, and finally receives, according to the start PF, the start PO, and the first subframe set, the paging message sent by the base station. In this way, because a first radio frame parameter is set, UE in a coverage enhancement mode may be enabled to receive only one paging message in one subframe, thereby implementing paging of UE in an area with relatively poor signal coverage.

Figure 13:
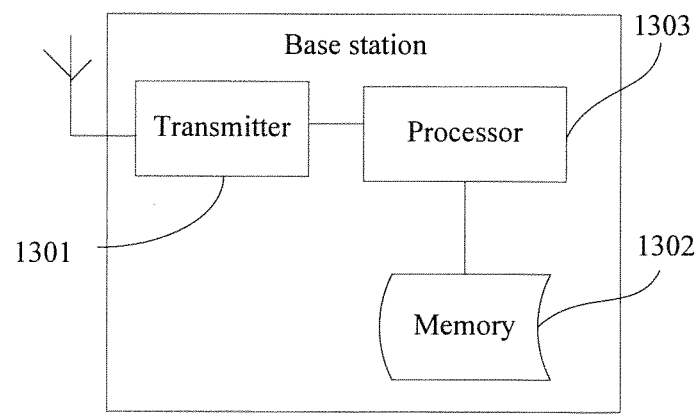
FIG. 13 is a schematic structural diagram of a base station according to an embodiment of the present invention.

As shown in FIG. 13, FIG. 13 is a schematic structural diagram of a base station according to an embodiment of the present invention. Referring to FIG. 13, the base station includes: a transmitter 1301, a memory 1302, and a processor 1303 separately connected to the transmitter 1301 and the memory 1302.

The memory 1302 stores a group of program code, and the transmitter 1301 is configured to invoke the program code in the memory 1302. Specifically:

The transmitter 1301 is configured to send a broadcast message to user equipment UE.

The broadcast message includes: a first radio frame parameter.

It should be noted that, there are the following five cases of the first radio frame parameter: In a first case, the first radio frame parameter is nB, where nB is used to determine a quantity of paging occasions in each paging frame, a value of nB is less than a value of a first discontinuous reception period, and the first discontinuous reception period is a period in which the UE in the coverage enhancement mode receives a paging message. In a second case, the first radio frame parameter is nB and a first discontinuous reception period. In a third case, the first radio frame parameter is a first discontinuous reception period. In a fourth case, the first radio frame parameter is a first discontinuous reception period and a PF offset. In a fifth case, the first radio frame parameter is a first discontinuous reception period, and a PF offset, and a first PO.

The processor 1303 is configured to determine whether the UE is first UE.

The first UE is UE in the coverage enhancement mode. The coverage enhancement mode is a mode in which the base station needs to repeatedly send a paging message.

The processor 1303 is further configured to: in a case in which it is determined that the UE is the first UE, determine a start PF and a start PO according to the first radio frame parameter.

Specifically, the first radio frame parameter is a first discontinuous reception period, where the first discontinuous reception period is a period in which UE in the coverage enhancement mode receives a paging message. The processor 1303 is specifically configured to determine a PF, which meets a formula SFNmodT=0, in a system frame number SFN as the start PF, and determine a preset PO as the start PO, where T denotes the first discontinuous reception period.

Specifically, the first radio frame parameter is a first discontinuous reception period and a PF offset. The processor 1303 is specifically configured to determine a PF, which meets a formula SFNmodT=W, in an SFN as the start PF, and determine a preset PO as the start PO, where W denotes the PF offset, and T denotes the first discontinuous reception period.

Specifically, the first radio frame parameter is a first discontinuous reception period, and a PF offset, and a first PO. The processor 1303 is specifically configured to determine a PF, which meets a formula SFNmodT=W, in an SFN as the start PF, and determine the first PO as the start PO, where T denotes the first discontinuous reception period, and W denotes the PF offset.

The processor 1303 is further configured to determine a first subframe set according to the start PF and the start PO.

The first subframe set includes M first subframes in which the paging message can be sent and that follow the start PO of the start PF. M is a quantity of times that the base station needs to repeatedly send a paging message.

Specifically, the first subframe is a subframe, other than a multicast broadcast single frequency network MBSFN subframe, in each frame. or, the first subframe is a subframe whose sequence number is 0 or 4 or 5 or 9 in each frame. or, the first subframe is a subframe whose sequence number is 0 or 1 or 5 or 6 in each frame.

The transmitter 1301 is further configured to send the paging message to the UE according to the start PF, the start PO, and the first subframe set.

Further, the broadcast message further includes: a second radio frame parameter. A value of the second radio frame parameter is different from a value of the first radio frame parameter.

The processor 1303 is further configured to: in a case in which it is determined that the UE is not the first UE, determine a second subframe according to the second radio frame parameter.

The transmitter 1301 is further configured to send a second paging message to the UE in the second subframe.

Figure 14:
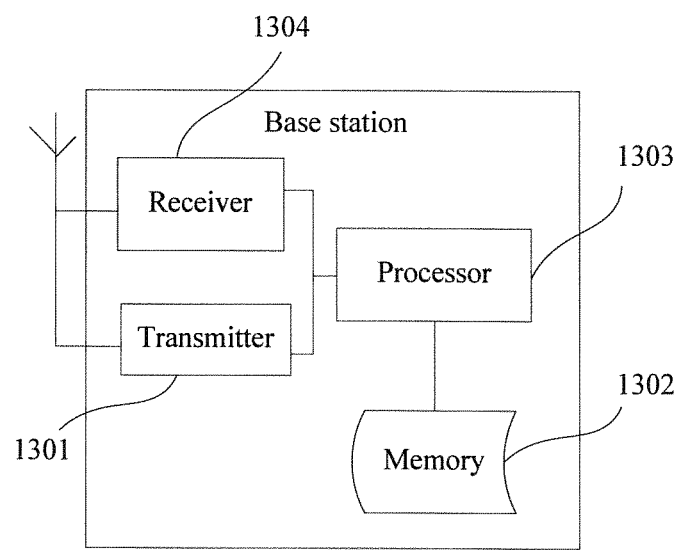
FIG. 14 is a schematic structural diagram of a base station according to an embodiment of the present invention.

Further, as shown in FIG. 14, the base station further includes: a receiver 1304.

In this case, the transmitter 1301 is further configured to send adjustment information to the UE.

The adjustment information is used to record a correspondence between a coverage enhancement level and a grading parameter, the grading parameter is used to differentiate UEs having different coverage enhancement levels, and a coverage enhancement level of the UE corresponds to a quantity of times that the UE needs to repeatedly receive a paging message.

Specifically, the grading parameter includes: a radio network temporary identity RNTI, or a PO offset, or a paging frame PF group, or a PO group, where the PF group is used to record a PF corresponding to one coverage enhancement level, and the PO group is used to record one PO corresponding to the coverage enhancement level.

The receiver 1304 is configured to receive the coverage enhancement level, sent by the UE, of the UE.

The processor 1303 is further configured to determine a grading parameter of the UE according to the adjustment information and the coverage enhancement level of the UE.

The processor 1303 is specifically configured to determine the start PF and the start PO according to the first radio frame parameter and the grading parameter of the UE.

The grading parameter includes: the PO offset.

The processor 1303 is specifically configured to determine a first PF and a first PO according to the first radio frame parameter.

The processor 1303 is specifically configured to: determine, as the start PF and the start PO, a corresponding PF and PO that are obtained after an offset of subframes whose quantity equals the PO offset of the UE and in which the paging message can be received is performed starting with the first PO of the first PF.

Specifically, the grading parameter includes: the PF group, where the processor 1303 is specifically configured to determine a first PF and the first PO according to the first radio frame parameter. The processor 1303 is specifically configured to determine the first PF and the first PO of a PF corresponding to the PF group of the UE as the start PF and the start PO.

Specifically, the grading parameter includes: the PO group, where the processor 1303 is specifically configured to determine a first PF according to the first radio frame parameter. The processor 1303 is specifically configured to determine the first PF and a PO corresponding to the PO group of the UE as the start PF and the start PO.

Alternatively:

The transmitter 1301 is specifically configured to send the paging message to the UE according to the start PF, the start PO, the first subframe set, and the grading parameter of the UE.

Specifically, the grading parameter includes: the RNTI, where the transmitter 1301 is specifically configured to send the paging message in the start PO of the start PF and in a subframe in the first subframe set according to the RNTI of the UE.

Further, the receiver 1304 is further configured to receive information, about a camp-on cell, sent by the UE and/or paging enhancement information.

The camp-on cell is a cell to which the UE is currently connected, and the paging enhancement information is used to indicate the coverage enhancement level of the UE.

For the base station provided in this embodiment of the present invention, the base station first sends a broadcast message to UE, and next, determines whether the UE is UE, that is, first UE, in a coverage enhancement mode. When it is determined that the UE is the first UE, the base station determines a start paging frame PF and a start paging occasion PO according to a first radio frame parameter, determines a first subframe set according to the start PF and the start PO, and finally sends a paging message according to the start PF, the start PO, and the first subframe set. In this way, because a first radio frame parameter is set, UE in a coverage enhancement mode may be enabled to receive only one paging message in one subframe, thereby implementing paging of UE in an area with relatively poor signal coverage.

Figure 15:
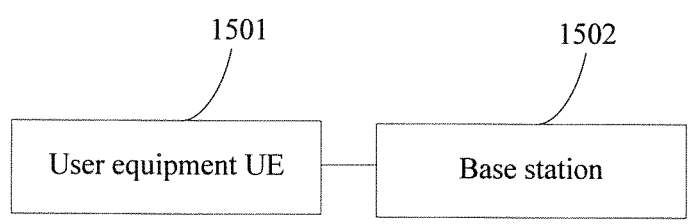
FIG. 15 is a schematic structural diagram of a paging system according to an embodiment of the present invention.

As shown in FIG. 15, FIG. 15 is a schematic structural diagram of a paging system according to an embodiment of the present invention. Referring to FIG. 15, the paging system includes: user equipment UE 1501 and a base station 1502.

The user equipment UE 1501 is the UE in the foregoing embodiment.

The base station 1502 is the base station in the foregoing embodiment.

For the paging system provided in this embodiment of the present invention, UE receives a broadcast message sent by a base station, and next, determines whether the UE is UE, that is, first UE, in a coverage enhancement mode. When the UE determines that the UE is the first UE, the UE and the base station both determine a start paging frame PF and a start paging occasion PO according to a first radio frame parameter, and determine a first subframe set according to the start PF and the start PO. Finally, the base station sends a paging message to the UE according to the start PF, the start PO, and the first subframe set, and the UE receives the paging message according to the start PF, the start PO, and the first subframe set. In this way, because a first radio frame parameter is set, UE in a coverage enhancement mode may be enabled to receive only one paging message in one subframe, thereby implementing paging of UE in an area with relatively poor signal coverage.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. User equipment (UE), comprising:
a receiving unit, configured to receive a broadcast message sent by a base station, wherein the broadcast message comprises: a first radio frame parameter; and
a determining unit, configured to:
determine whether the UE is first UE, wherein the first UE is UE in a coverage enhancement mode, and the coverage enhancement mode is a mode in which a paging message sent by the base station needs to be repeatedly received,
in a case in which it is determined that the UE is the first UE, determine a start paging frame (PF) and a start paging occasion (PO) according to the first radio frame parameter, and
determine a first subframe set according to the start PF and the start PO, wherein the first subframe set comprises M first subframes in which the paging message can be received and that follow the start PO of the start PF, and M is a quantity of times that the UE needs to repeatedly receive the paging message; and
wherein the receiving unit is further configured to receive, according to the start PF, the start PO, and the first subframe set, the paging message sent by the base station.

2. The UE according to claim 1, wherein:
the broadcast message further comprises: a second radio frame parameter, and a value of the second radio frame parameter is different from a value of the first radio frame parameter;
the determining unit is further configured to: in a case in which it is determined that the UE is not the first UE, determine a second subframe according to the second radio frame parameter; and
the receiving unit is further configured to receive, in the second subframe, a second paging message sent by the base station.

3. The UE according to claim 1, wherein:
the first radio frame parameter is nB, wherein nB is used to determine a quantity of paging occasions in each paging frame, a value of nB is less than a value of a first discontinuous reception period, and the first discontinuous reception period is a period in which the UE in the coverage enhancement mode receives a paging message.

4. The UE according to claim 1, wherein:
the first radio frame parameter is a first discontinuous reception period, wherein the first discontinuous reception period is a period in which the UE in the coverage enhancement mode receives a paging message; and
the determining unit is configured to determine a PF, which meets a formula SFNmodT=0, in a system frame number SFN as the start PF, and determine a preset PO as the start PO, wherein T denotes the first discontinuous reception period.

5. A base station, comprising:
a sending unit, configured to send a broadcast message to user equipment (UE), wherein the broadcast message comprises: a first radio frame parameter; and
a determining unit, configured to:
determine whether the UE is first UE, wherein the first UE is UE in a coverage enhancement mode, and the coverage enhancement mode is a mode in which the base station needs to repeatedly send a paging message,
in a case in which it is determined that the UE is the first UE, determine a start paging frame (PF) and a start paging occasion (PO) according to the first radio frame parameter, and
determine a first subframe set according to the start PF and the start PO, wherein the first subframe set comprises M first subframes in which the paging message can be sent and that follow the start PO of the start PF, and M is a quantity of times that the base station needs to repeatedly send the paging message; and
wherein the sending unit is configured to send the paging message to the UE according to the start PF, the start PO, and the first subframe set.

6. The base station according to claim 5, wherein:
the broadcast message further comprises: a second radio frame parameter, and a value of the second radio frame parameter is different from a value of the first radio frame parameter;
the determining unit is further configured to: in a case in which it is determined that the UE is not the first UE, determine a second subframe according to the second radio frame parameter; and
the sending unit is further configured to send a second paging message to the UE in the second subframe.

7. The base station according to claim 5, wherein:
the first radio frame parameter is nB, wherein nB is used to determine a quantity of paging occasions in each paging frame, a value of nB is less than a value of a first discontinuous reception period, and the first discontinuous reception period is a period in which the UE in the coverage enhancement mode receives a paging message.

8. The base station according to claim 5, wherein:
the first radio frame parameter is a first discontinuous reception period, wherein the first discontinuous reception period is a period in which the UE in the coverage enhancement mode receives a paging message; and
the determining unit is specifically configured to determine a PF, which meets a formula SFNmodT=0, in a system frame number SFN as the start PF, and determine a preset PO as the start PO, wherein T denotes the first discontinuous reception period.

9. A paging method, comprising:
receiving, by user equipment (UE), a broadcast message sent by a base station, wherein the broadcast message comprises: a first radio frame parameter;
determining, by the UE, whether the UE is first UE, wherein the first UE is UE in a coverage enhancement mode, and the coverage enhancement mode is a mode in which a paging message sent by the base station needs to be repeatedly received;
when the UE determines that the UE is the first UE, determining, by the UE, a start paging frame (PF) and a start paging occasion (PO) according to the first radio frame parameter;
determining, by the UE, a first subframe set according to the start PF and the start PO, wherein the first subframe set comprises M first subframes in which the paging message can be received and that follow the start PO of the start PF, and M is a quantity of times that the UE needs to repeatedly receive the paging message; and
receiving, by the UE according to the start PF, the start PO, and the first subframe set, the paging message sent by the base station.

10. The method according to claim 9, wherein:
the broadcast message further comprises: a second radio frame parameter, and a value of the second radio frame parameter is different from a value of the first radio frame parameter;
when the UE determines that the UE is not the first UE, the UE determines a second subframe according to the second radio frame parameter; and
the UE receives, in the second subframe, a second paging message sent by the base station.

11. The method according to claim 9, wherein:
the first radio frame parameter is nB, wherein nB is used to determine a quantity of paging occasions in each paging frame, a value of nB is less than a value of a first discontinuous reception period, and the first discontinuous reception period is a period in which the UE in the coverage enhancement mode receives a paging message.

12. A paging method, comprising:
sending, by a base station, a broadcast message to user equipment (UE), wherein the broadcast message comprises: a first radio frame parameter;
determining, by the base station, whether the UE is first UE, wherein the first UE is UE in a coverage enhancement mode, and the coverage enhancement mode is a mode in which the base station needs to repeatedly send a paging message;
when the base station determines that the UE is the first UE, determining, by the base station, a start paging frame (PF) and a start pagin occasion (PO) according to the first radio frame parameter;
determining, by the base station, a first subframe set according to the start PF and the start PO, wherein the first subframe set comprises M first subframes in which the paging message can be sent, following the start PO of the start PF, and M is a quantity of times that the base station needs to repeatedly send the paging message; and
sending, by the base station, the paging message to the UE according to the start PF, the start PO, and the first subframe set.

13. The method according to claim 12, wherein:
the broadcast message further comprises: a second radio frame parameter, and a value of the second radio frame parameter is different from a value of the first radio frame parameter;
when the base station determines that the UE is not the first UE, the base station determines a second subframe according to the second radio frame parameter; and
the base station sends a second paging message to the UE in the second subframe.

14. The method according to claim 12, wherein:
the first radio frame parameter is nB, wherein nB is used to determine a quantity of paging occasions in each paging frame, a value of nB is less than a value of a first discontinuous reception period, and the first discontinuous reception period is a period in which the UE in the coverage enhancement mode receives a paging message.

15. The method according to claim 12, wherein:
the first radio frame parameter is a first discontinuous reception period, wherein the first discontinuous reception period is a period in which the UE in the coverage enhancement mode receives a paging message; and
determining, by the base station, a start PF and a start PO according to the first radio frame parameter comprises:
determining, by the base station, a PF, which meets a formula SFNmodT=0, in a system frame number SFN as the start PF, and determining a preset PO as the start PO, wherein T denotes the first discontinuous reception period.

* * * * *